United States Patent
Ishigure

(10) Patent No.: US 8,958,096 B2
(45) Date of Patent: Feb. 17, 2015

(54) IMAGE FORMING APPARATUS AND IMAGE FORMING SYSTEM FOR SECURE PRINTING

(71) Applicant: Oki Data Corporation, Minato-ku, Tokyo (JP)

(72) Inventor: Tsuyoshi Ishigure, Tokyo (JP)

(73) Assignee: Oki Data Corporation, Tokyo (JP)

( * ) Notice: Subject to any disclaimer, the term of this patent is extended or adjusted under 35 U.S.C. 154(b) by 119 days.

(21) Appl. No.: 13/683,027

(22) Filed: Nov. 21, 2012

(65) Prior Publication Data

US 2013/0135661 A1   May 30, 2013

(30) Foreign Application Priority Data

Nov. 25, 2011   (JP) ................ 2011-257261

(51) Int. Cl.
  *G06K 15/00* (2006.01)
  *G06K 15/02* (2006.01)
  *G06F 3/12* (2006.01)

(52) U.S. Cl.
  CPC .............. *G06K 15/02* (2013.01); *G06K 15/402* (2013.01); *G06K 15/4095* (2013.01); *G06F 3/1222* (2013.01); *G06F 3/1238* (2013.01); *G06F 3/1267* (2013.01); *G06F 3/1288* (2013.01); *G06F 3/1291* (2013.01)
  USPC ............. 358/1.15; 358/1.14; 358/1.1; 400/61

(58) Field of Classification Search
  USPC ................................................ 358/1.1–1.16
  See application file for complete search history.

(56) References Cited

U.S. PATENT DOCUMENTS

| | | | |
|---|---|---|---|
| 2008/0055627 A1* | 3/2008 | Ellis | 358/1.14 |
| 2008/0062471 A1* | 3/2008 | Matsuda | 358/402 |
| 2009/0132707 A1* | 5/2009 | Mizuno | 709/226 |

FOREIGN PATENT DOCUMENTS

| | | |
|---|---|---|
| JP | 2002-187317 A | 7/2002 |
| JP | 2004-159281 A | 6/2004 |
| JP | 2007-320292 A | 12/2007 |
| JP | 2009-193322 A | 8/2009 |
| JP | 2011-209820 A | 10/2011 |
| JP | 2011-211302 A | 10/2011 |

* cited by examiner

*Primary Examiner* — Benny Q Tieu
*Assistant Examiner* — Michael Y Tzeng
(74) *Attorney, Agent, or Firm* — Panitch Schwarze Belisario & Nadel LLP

(57) ABSTRACT

Image forming apparatus and system include a searcher and a search responder, wherein the searcher transmits a first search-message notifying first identification-information and first group-confirmation-information to other image forming apparatuses, receives a search-response-message notifying second identification-information, and to store the second identification-information notified by the received second search-response-message in the storage. The search responder receives a second search-message notifying third identification-information for identifying any of the second image forming apparatuses and second group-confirmation-information for confirming a second apparatus-group to which any of the second image forming apparatuses belong from any of the second image forming apparatuses, and to transmit a first search-response-message for notifying the first identification-information to a transmission originator of the received second search-message, when the second apparatus-group confirmed by the second group-confirmation-information notified by the received second search-message is the same as the first apparatus-group to which the first image forming apparatus belongs.

12 Claims, 19 Drawing Sheets

FIG. 3

| No. | IP ADDRESS | PRINTER-NAME | OPERATION CONFIRMATION "○" "×" | APPARATUS-TYPE | MAXIMUM-PAPER-SIZE | TONER-REMAINING-AMOUNT | ... |
|---|---|---|---|---|---|---|---|
| 1 | 192.168.1.1 | PRINTER A | ○ | ColorPrinter | A4 | C: 100%, M: 100%, Y: 100%, K: 100% | ... |
| 2 | 192.168.1.2 | PRINTER B | ○ | ColorPrinter | A4 | C: 80%, M: 80%, Y: 80%, K: 80% | ... |
| 3 | 192.168.1.3 | PRINTER C | ○ | ColorPrinter | A4 | C: 50%, M: 50%, Y: 50%, K: 50% | ... |
| ... | ... | ... | ... | ... | ... | ... | ... |

(TO FIG. 9)

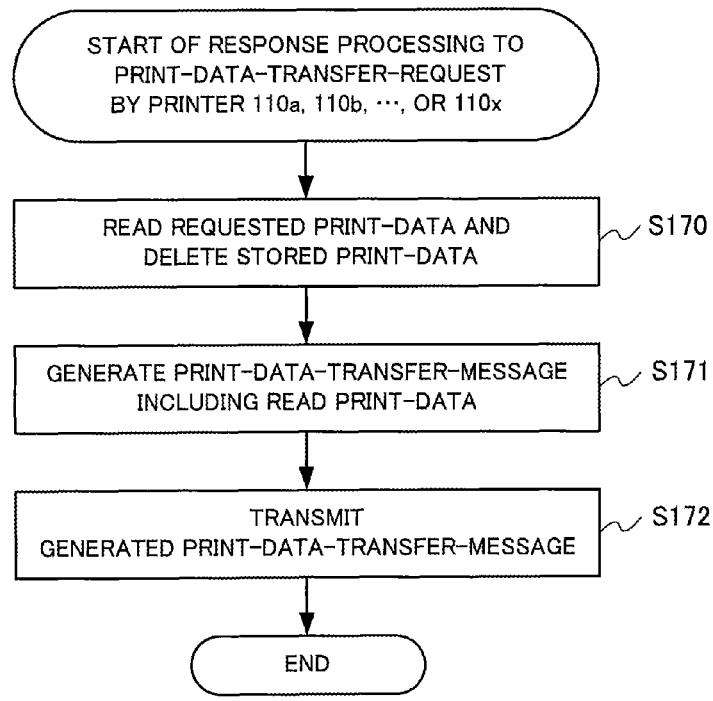
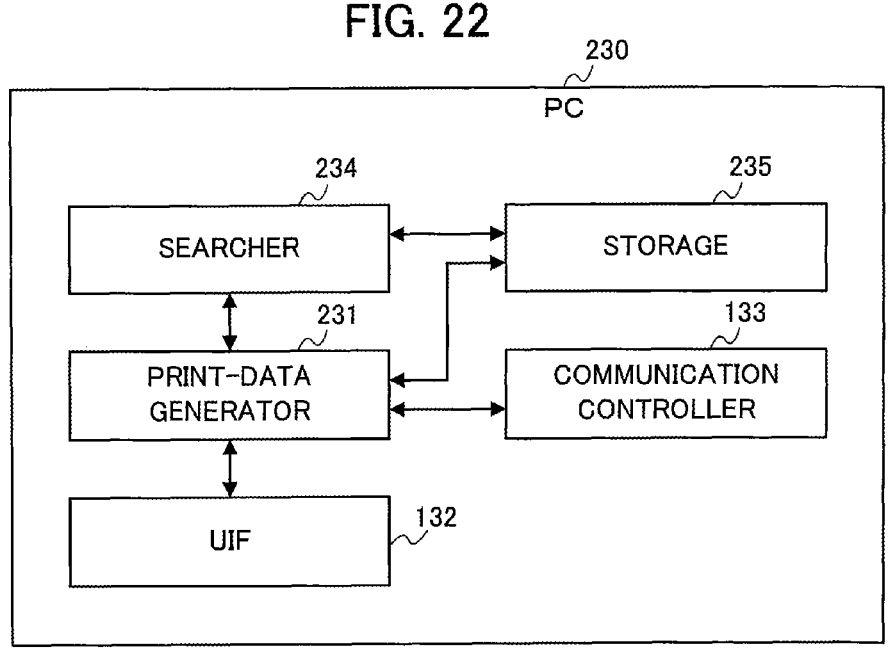

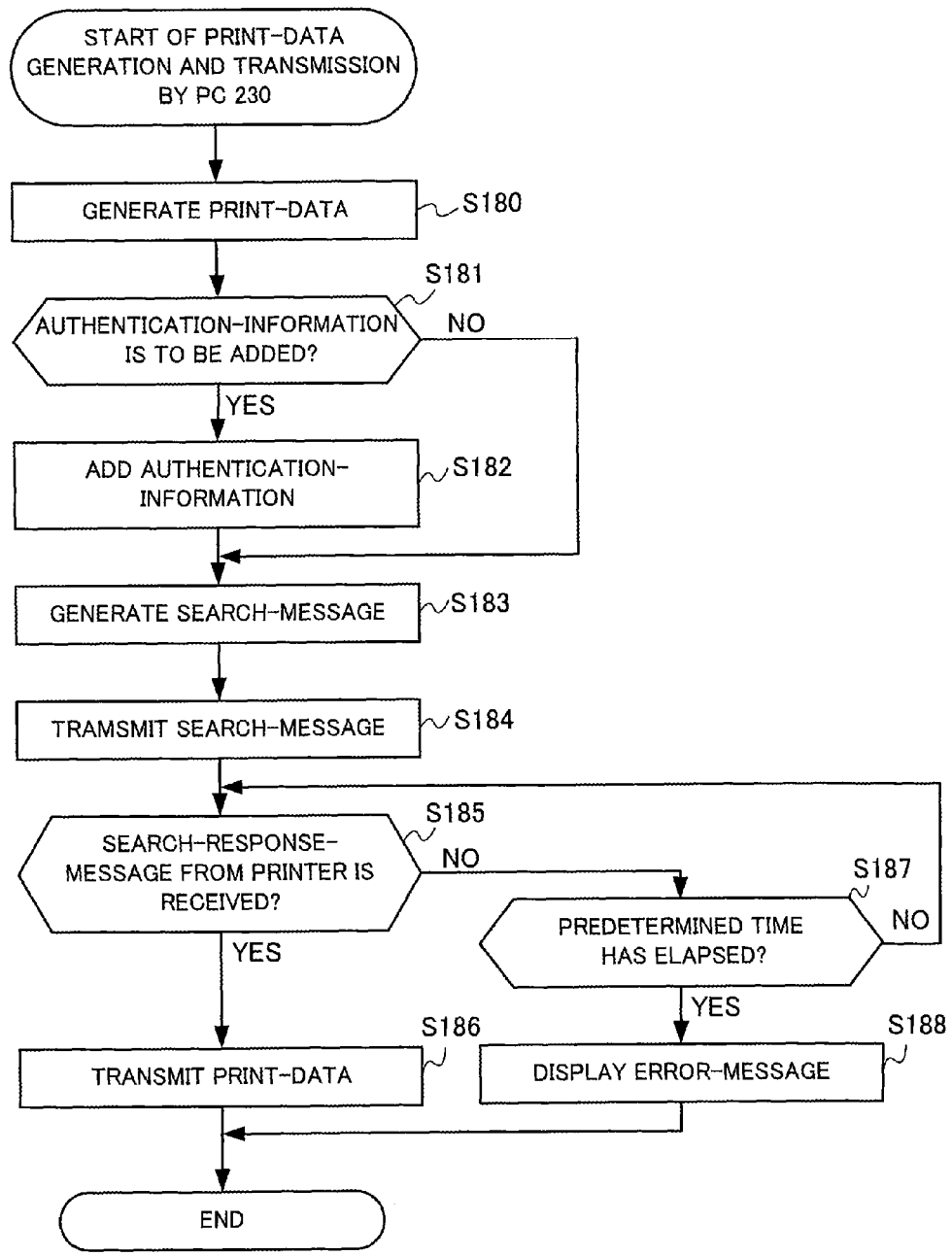

IMAGE FORMING APPARATUS AND IMAGE FORMING SYSTEM FOR SECURE PRINTING

BACKGROUND OF THE INVENTION

1. Field of the Invention

The present invention relates to an image forming apparatus and an image forming system.

2. Description of the Related Art

There is a conventional technique, in which a user selects one of a plurality of printers connected to a network so that printing is performed by the selected printer.

For example, Japanese Patent Kokai Publication No. 2009-193322 as Patent Document 1 discloses a printing system which includes a plurality of print servers, a plurality of printers and a plurality of client computers, which are connected to a network. In this printing system, when a print job is transmitted from one client computer to one print server, the print server stores the print job and the print server notifies information about the stored print job to all the printers connected to the network. This enables all the printers to know the print job that the print server stores. When the user inputs a print instruction by designating the print job stored in the print server using one of the printers, printing based on the designated print job is performed.

However, in the conventional technique, since all information on the print job is transmitted to all the printers connected to the network, printing based on the designated print job is possible at any of the printers connected to the network, which is problematic from a viewpoint of security.

SUMMARY OF THE INVENTION

An object of the present invention is to provide an image forming apparatus and an image forming system that can increase security without deteriorating convenience for users.

According to an aspect of the present invention, an image forming apparatus includes a communication controller configured to transmit and receive information to and from a network; a storage; a searcher; and a search responder. The searcher is configured to transmit a first search-message notifying first identification-information for identifying the image forming apparatus as a first image forming apparatus and first group-confirmation-information used for confirming a first apparatus-group to which the first image forming apparatus belongs, through the communication controller to second image forming apparatuses connected to the network, to receive a second search-response-message notifying second identification-information for identifying any of the second image forming apparatuses, through the communication controller from the second image forming apparatuses, and to store the second identification-information notified by the received second search-response-message in the storage. The search responder is configured to receive a second search-message notifying third identification-information for identifying any of the second image forming apparatuses and second group-confirmation-information for confirming a second apparatus-group to which any of the second image forming apparatuses belong, through the communication controller from any of the second image forming apparatuses, and to transmit a first search-response-message for notifying the first identification-information, through the communication controller to a transmission originator of the received second search-message, when the second apparatus-group confirmed by the second group-confirmation-information notified by the received second search-message is the same as the first apparatus-group to which the first image forming apparatus belongs.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a diagram showing an example of printer-information stored in a printer-information memory of the printer according to the first embodiment;

FIG. 21 is a flowchart showing response processing of the printer when the printer received a print-data-transfer-request-message in the first embodiment;

FIG. 22 is a block diagram schematically showing an arrangement of a PC in the image forming system according to the second embodiment; and FIG. 23 is a flowchart showing print-data generation and transmission of the PC in the image forming system according to the second embodiment.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
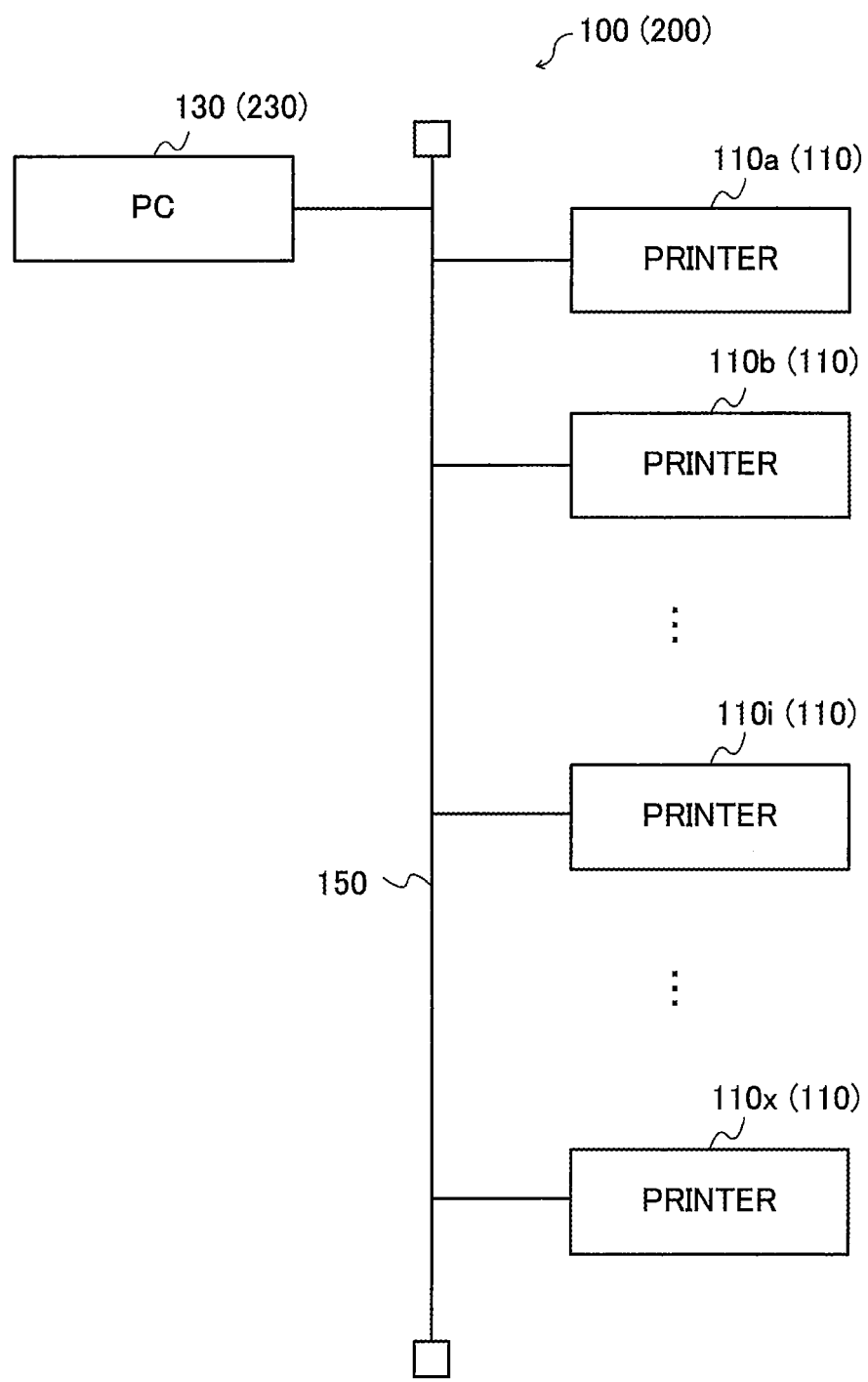
FIG. 1 is a diagram schematically showing an arrangement of an image forming system according to first and second embodiments of the present invention.

FIG. 1 is a diagram schematically showing an arrangement of an image forming system 100 according to a first embodiment. The image forming system 100 includes a plurality of printers 110 (e.g., 110a, 110b, ..., 100i, ..., 100x) as image forming apparatuses and one or more personal computers (PCs) 130 as information processing apparatuses.

In the first and second embodiments, any of the plurality of printers 110 (110a, 110b, ..., 110x) in the image forming system 100 is also referred to as a "printer 110". Further, in the first and second embodiments, although each of the printers 110 (e.g., 110a, 110b, ..., 110x) may have the same configuration, a printer as an own-apparatus in the image forming system 100 is referred to as "printer 110 (e.g., 110a)" and printers other than the printer 110 (e.g., 110a) as the own-apparatus in the image forming system 100 are referred to as "printers 110 (110b, ..., 110x)" or "other printers 110 (110b, ..., 110x)" for convenience. Moreover, one of the other printers 110 (110b, ..., 110x) is indicated as a "printer 110i" in FIG. 1.

In the first embodiment, the plurality of printers 110 (e.g., 110a, 110b, ..., 100x) and at least one PC 130 are connected to a network 150. Further, reference numeral 200 and 230 in FIG. 1 will be used in a second embodiment in place of the reference numerals 100 and 130.

Figure 2:
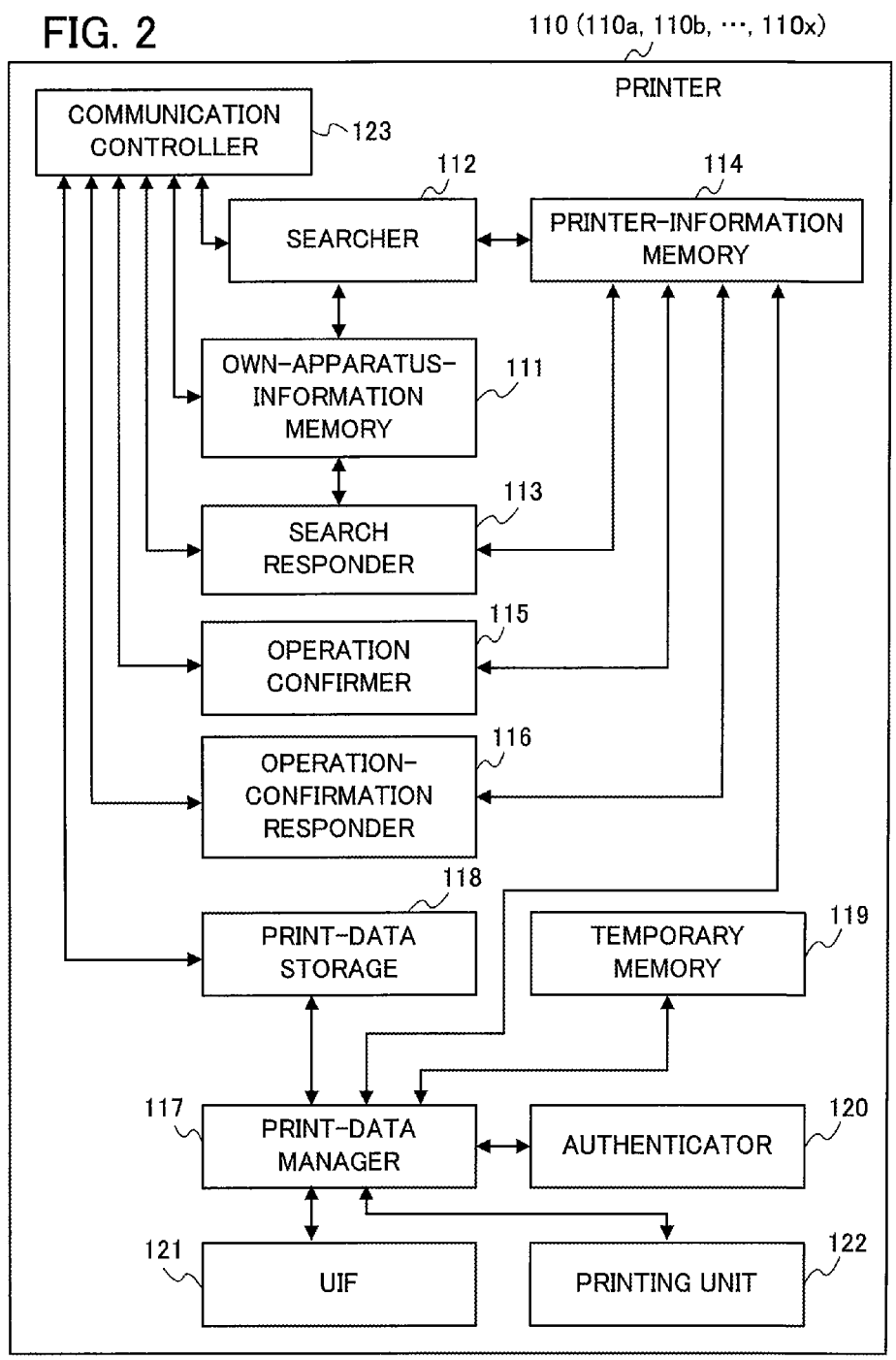
FIG. 2 is a block diagram schematically showing an arrangement of a printer as an image forming apparatus according to the first embodiment.

FIG. 2 is a block diagram schematically showing an arrangement of the printer 110 (i.e., 110a, 110b, ..., or 110x). The printer 110 (e.g., 110a) includes an own-apparatus-information memory 111 for storing information about the printer 110a itself, a searcher 112, a search responder 113, a printer-information memory 114 for storing information about the plurality of printers, an operation confirmer 115, an operation-confirmation responder 116, a print-data manager 117 as an image-information manager, a print-data storage 118 as an image-information memory, a temporary memory 119, an authenticator 120, a user interface (UIF) 121, a printing unit 122 as an image-forming unit, and a communication controller 123.

The searcher 112 is configured to transmit a search-message notifying identification-information for identifying the image forming apparatus 110 (e.g., 110a) and first group-confirmation-information used for confirming a first apparatus-group to which the image forming apparatus 110 (e.g., 110a) belongs, through the communication controller 123 to the other image forming apparatuses 110 (e.g., 110b, ..., 110x) connected to the network (150). The searcher 112 is also configured to receive a second search-response-message notifying second identification-information for identifying any of the other image forming apparatuses 110 (e.g., 110b, ..., 110x), and to store the second identification-information notified by the received second search-response-message in the storage (114). The search responder 113 is configured to receive a second search-message notifying identification-information for identifying any of the other image forming apparatuses 110 (e.g., 110b, ..., 110x) and second group-confirmation-information for confirming a second apparatus-group to which any of the other image forming apparatuses 110 (e.g., 110b, ..., 110x) belongs, from any of the other image forming apparatuses 110 (e.g., 110b, ..., 110x), and to transmit a search-response-message for notifying the first identification-information, to a transmission originator of the received search-message, when the second apparatus-group confirmed by the second group-confirmation-information notified by the received second search-message is the same as the first apparatus-group to which the image forming apparatus 110 (e.g., 110a) belongs.

The searcher 112, the search responder 113, the operation confirmer 115, the operation-confirmation responder 116 and the print-data manager 117 form a control device of the printer 110. The own-apparatus-information memory 111, the printer-information memory 114, the print-data storage 118 and the temporary memory 119 form a storage device of the printer 110.

The own-apparatus-information memory 111 of the printer 110 (e.g., 110a) stores information about the printer 110 (e.g., 110a) itself (i.e., the own-apparatus). The own-apparatus-information memory 111 of the printer 110 (e.g., 110a) stores identification-information, name-information and apparatus-type of the printer 110 itself, capability-information indicative of the ability of the printer 110 (e.g., 110a) itself, consumables-status-information indicative of states of consumable articles in the printer 110 (e.g., 110a) itself, and other information of the printer 110 (e.g., 110a) itself, for example.

The identification-information of the printer 110 (e.g., 110a) as the own-apparatus may be, for example, a communication address for identification among the apparatuses in the network 150. The communication address may be, for example, an IP-address, a MAC address, a combination of the IP-address and the MAC address, or other addresses.

When a passphrase as group-confirmation-information to confirm that the printer 110 (e.g., 110a) as the own-apparatus belongs to a specific printer-group is set in the printer 110 (e.g., 110a) itself, the own-apparatus-information memory 111 of the printer 110 (e.g., 110a) stores the passphrase. For example, the passphrase is inputted through the UIF 121 to the printer 110 (e.g., 110a) by a user of the printer 110 (e.g., 110a) or an administrator of the image forming system 100.

A plurality of passphrases may be stored in the own-apparatus-information memory 111 of the printer 110 (e.g., 110a). In this case, it is desirable that a plurality of printer-information memories 114 be provided in the printer 110 (e.g., 110a) so that the stored passphrases and the printer-information memories 114 are in a one-to-one correspondence respectively.

The searcher 112 of the printer 110 (e.g., 110a) searches the other printers 110 (e.g., 110b, ..., 110x) connected to the network 150. For example, the searcher 112 of the printer 110 (e.g., 110a) transmits a predetermined search-message through the communication controller 123 to the other printers 110 (e.g., 110b, ..., 110x) connected to the network 150. In this connection, it is desirable that the searcher 112 transmit the search-message by broadcasting which is a method of transferring the search-message to all recipients connected to the network 150 simultaneously. When the passphrase is set for the printer 110 (e.g., 110*a*) as the own-apparatus, the search-message includes the passphrase. The search-message may include apparatus-information, if necessary. The apparatus-information may include any or all of the identification-information, names, capability-information and consumables-status-information of the printer 110*a*. In general, such information is stored in the own-apparatus-information memory 111.

The searcher 112 of the printer 110 (e.g., 110*a*) receives a search-response-message from the other printers 110 (e.g., 110*b*, . . . , 110*x*) connected to the network 150 through the communication controller 123. The search-response-message is a response to the received search-message. The search-response-message may include the apparatus-information of any of the other printers 110 (e.g., 110*b*, . . . , 110*x*) as the transmission originators of the search-response-message. On the basis of the apparatus-information included in the search-response-message, the searcher 112 updates the printer-information stored in the printer-information memory 114.

The search responder 113 of the printer 110 (e.g., 110*a*) receives a search-message transmitted from any of the other printers 110 (e.g., 110*b*, . . . , 110*x*) connected to the network 150 through the communication controller 123. The search responder 113 extracts the apparatus-information of the other printers 110 (e.g., 110*b*, . . . , 110*x*) as the transmission originator of the search-message, from the received search-message. The search responder 113 updates the printer-information which is stored in the printer-information memory 114 on the basis of the extracted apparatus-information. Further, the search responder 113 of the printer 110 (e.g., 110*a*) transmits the search-response-message through the communication controller 123 to the other printers 110 (e.g., 110*b*, . . . , 110*x*) as the transmission originator of the search-message. The search-response-message transmitted from the search responder 113 may include the apparatus-information of the printer 110 (e.g., 110*a*) itself.

When the passphrase is set in any of the other printers 110 (e.g., 110*b*, . . . , 110*x*) as the transmission originators of the search-messages, the passphrase is included in each of the search-messages. When receiving the search-message including the passphrase, the search responder 113 of the printer 110 (e.g., 110*a*) as the own-apparatus confirms whether or not the passphrase included in the received search-message coincides with the passphrase set in the printer 110 (e.g., 110*a*). When finding a coincidence of these passphrases, the search responder 113 updates the printer-information stored in the printer-information memory 114 and also transmits the search-response-message. On the other hand, when failing to find a coincidence of these passphrases, the search responder 113 performs no such operations. In this connection, the search responder 113 may be configured to determine that a coincidence of the passphrases takes place when the passphrase is not included in the search-message or may be configured to determine that a coincidence of the passphrases does not take place when the passphrase is not included in the search-message.

The printer-information memory 114 stores printer-information (i.e., apparatus-information) of the other printers 110 (e.g., 110*b*, . . . , 110*x*) connected to the network 150. FIG. 3 is a diagram schematically showing an example of the printer-information 114*a*. The printer-information 114*a* is a table type information having a number (No.) column 114*b*, an IP-address column 114*c*, a printer-name column 114*d*, an operation-confirmation column 114*e* which indicates whether operation-confirmation is needed or no operation-confirmation is needed, an apparatus-type column 114*f*, a maximum-paper-size column 114*g*, and a toner-remaining-amount column 114*h*, for example.

Identification numbers "1, 2, 3, . . . " for discriminating between rows are recorded in the number column 114*b*.

IP-addresses of the printers "A, B, C, . . . " which are identification-information of the other printers 110 (e.g., 110*b*, . . . , 110*x*) as transmission originators of the apparatus-information, are stored in the IP-address column 114*c*.

Printer-names "PRINTER A, PRINTER B, . . . " of the other printers 110 (e.g., 110*b*, . . . , 110*x*) which are identified in the IP-address column 114*c*, are stored in the printer-name column 114*d*. In the first embodiment, each of the printer-names of the other printers 110 (e.g., 110*b*, . . . , 110*x*) includes identification-information indicative of being a printer as an image forming apparatus. In an example of FIG. 3, a character string of "PRINTER" is included in each of the printer-names 114*d* of the other printers 110 (e.g., 110*b*, . . . , 110*x*).

Operation-confirmation-information of the other printers 110 (e.g., 110*b*, . . . , 110*x*) identified in the IP-address column 114*c* indicating whether operation-confirmation is needed or not is recorded in the operation-confirmation column 114*e*. In the first embodiment and FIG. 3, operation-confirmation-information is shown by "Confirmation Needed" (shown as a mark "O" in FIG. 3) indicating that the operation-confirmation is needed and by "No Confirmation Needed" (shown as a mark "X" in FIG. 3) indicating that no operation-confirmation is needed.

Apparatus-types for identifying types of the other printers 110 (e.g., 110*b*, . . . , 110*x*) identified in the IP-address column 114*c* are recorded in the apparatus-type column 114*f*.

Maximum-paper-sizes capable of being printed by the other printers 110 (e.g., 110*b*, . . . , 110*x*) identified in the IP-address column 114*c* are recorded in the maximum-paper-size column 114*g*.

Toner-remaining-amounts of the other printers 110 (e.g., 110*b*, . . . , 110*x*) identified in the IP-address column 114*c* are recorded in the toner-remaining-amount column 114*h*. In this case, the toner-remaining-amounts of C (cyan), M (magenta), Y (yellow) and K (black) toners are recorded in the toner-remaining-amount column 114*h*.

In the printer-information 114*a* shown in FIG. 3, the identification-information of the other printers 110 (e.g., 110*b*, . . . , 110*x*) is an IP-address, the capability information of the other printers 110 (e.g., 110*b*, . . . , 110*x*) is a maximum-paper-size, and the consumables-status-information of the other printers 110 (e.g., 110*b*, . . . , 110*x*) is the toner-remaining-amount. In place of these examples, the identification-information of the other printers 110 (e.g., 110*b*, . . . , 110*x*) may be a MAC address or may include a MAC address, for example. The capability information may be information indicative of at least one of color printing compatibility or non-compatibility and a resolution, or may include information indicative of both of color printing compatibility and the resolution. The consumables-status-information may be information indicative of one of the paper-remaining-amount and the life of a photosensitive drum, or may include information indicative of both of the paper-remaining-amount and the life of the photosensitive drum. In addition, the printer-information 114*a* may further have a column for storing the status of the other printers 110 (e.g., 110*b*, . . . , 110*x*) identified in the IP-address column 114*c*, for example, a column for storing status-information indicative of trouble occurrence or the like.

Referring to FIG. 2, the operation confirmer 115 of the printer 110 (e.g., 110a) confirms operation of the other printers 110 (e.g., 110b, . . . , 110x) identified in the printer-information 114a at a predetermined time, for example, periodically (at intervals of a predetermine duration) or at a specific time. For example, the operation confirmer 115 transmits an operation-confirmation-message as an operation-confirmation-request having the IP-address stored in the printer-information memory 114 and recorded in the printer-information 114a as a destination. The operation-confirmation-message may include identification-information of the printer 110 (e.g., 110a) as the own-apparatus. Further, the operation-confirmation-message may include information about the other printers 110 (e.g., 110b, . . . , 110x) as the other apparatuses. The operation-confirmation-message may be apparatus-status-information as the status-information of the printer 110a as the own-apparatus, for example, trouble-information such as paper jamming. The operation confirmer 115 transmits the operation-confirmation-message and thereafter waits for the operation-confirmation-response-messages from the other printers 110 (e.g., 110b, . . . , 110x) for a predetermined time. When acquiring the operation-confirmation-response-message within a predetermined time through the communication controller 123, the operation confirmer 115 determines that the other printers 110 (e.g., 110b, . . . , 110x) as the transmission originators of the operation-confirmation-response-messages are normally operating. When failing to acquire the operation-confirmation-response-messages within the predetermined time, on the other hand, the operation confirmer 115 determines the other printers 110 (e.g., 110b, . . . , 110x) not returning the operation-confirmation-response-messages to the printer 110 (e.g., 110a) are not operating normally (i.e., defective in operation). When the search responder 113 is configured to determine non-coincidence of passphrases when the passphrase is not included in the search-message, the other printers recorded in the printer-information 114a are printers 110 (e.g., 110b, . . . , 110x) having the same passphrase as the passphrase stored in the printer 110 (e.g., 110a). On the other hand, when the search responder 113 is configured to determine a coincidence of passphrases when the passphrase is not included in the search-message, the other printers recorded in the printer-information 114a are printers having the same passphrase as the passphrase stored in the printer 110a and printers having no passphrase.

The operation confirmer 115 deletes the apparatus-information of the other printers 110 (e.g., 110b, . . . , 110x) determined as defective operation from the printer-information 114a. When there is any printer 110 (e.g., 110b, . . . , 110x) determined as defective operation, the operation confirmer 115 may delete all the apparatus-information recorded in the printer-information 114a, and may cause the searcher 112 to again perform the searching operation of the other printers 110 (e.g., 110b, . . . , 110x). When the consumables-status-information and apparatus-status-information of the other printers 110 (e.g., 110b, . . . , 110x) as the transmission originators are included in the operation-confirmation-response-message, the operation confirmer 115 updates the printer-information 114a on the basis of the information such as the consumables-status-information and printer-status-information (apparatus-status-information) included in the other printers 110 (e.g., 110b, . . . , 110x).

The operation-confirmation responder 116 receives the operation-confirmation-messages through the communication controller 123 from the other printers 110 (e.g., 110b, . . . , 110x). The operation-confirmation responder 116 transmits the operation-confirmation-response-messages as responses to the operation-confirmation-messages through the communication controller 123 to the other printers 110 (e.g., 110b, . . . , 110x) as the transmission originators of the received operation-confirmation-messages. Each of the operation-confirmation-response-messages may include identification-information of the printer 110 (e.g., 110a) as the own-apparatus and may include consumables-status-information such as the maximum-paper-size of the printer 110 (e.g., 110a) as the own-apparatus. Further, each of the operation-confirmation-response-message may include, for example, trouble-information such as paper jamming as the printer-status-information of the printer 110 (e.g., 110a) as the own-apparatus. When the received operation-confirmation-message includes the consumables-status-information and printer-status-information of the other printers 110 (e.g., 110b, . . . , 110x) as the transmission originators, the operation-confirmation responder 116 updates the printer-information 114a on the basis of the information such as the consumables-status-information and printer-status-information of the own-apparatus included in the received operation-confirmation-message. When receiving the operation-confirmation-message, the operation-confirmation responder 116 determines that the other printers 110 (e.g., 110b, . . . , 110x) as the transmission originators are normally operating, and sets the operation-confirmation-information of the printer-information 114a corresponding to the other printers 110 (e.g., 110b, . . . , 110x) at "No Confirmation Needed" (shown as a mark "X" in FIG. 3). This causes transmission of the operation-confirmation-message to the other printers 110 (e.g., 110b, . . . , 110x) to be skipped only once. When there is some abnormality in the printer 110a as the own-apparatus, the operation-confirmation responder 116 may be arranged so as not to transmit the operation-confirmation-response-message.

The print-data manager 117 receives print-data as image-information through the communication controller 123 and manages the print-data. For example, when the authentication-information is not attached to the received print-data, the print-data manager 117 causes the printing unit 122 to perform printing operation on the basis of the print-data. On the other hand, when the authentication-information is attached to the received print-data, the print-data manager 117 stores the print-data in the print-data storage 118.

When the authenticator 120 of the printer 110 (e.g., 110a) conducts authenticating processing at, the print-data manager 117 receives the authentication-information from the authenticator 120 and searches the print-data storage 118 for the print-data having authentication-information which coincides with the received authentication-information. Furthermore, the print-data manager 117 transmits a search-request-message including the received authentication-information to the other printers 110 (e.g., 110b, . . . , 110x) specified by the printer-information 114a through the communication controller 123. The print-data manager 117 receives a search-request-response-message as a response to the search-response-message through the communication controller 123. The print-data manager 117 generates a print-data-selection-picture for acceptance of selection of the print-data to be printed by the user on the basis of the print-data specified by the print-data-identification-information included in the received search-request-response-message and the print-data determined as associated with the authentication-information through the searching processing of the print-data storage 118 of the own-apparatus. The print-data manager 117 provides the generated print-data-selection-picture to the UIF 121 so that the user can select and specify the print-data through the print-data-selection-picture. The print-data manager 117 causes the printing unit 122 to perform its printing operation on the basis of the specified print-data. When the specified print-data is stored in the other printers 110 (e.g., 110b, . . . , 110x), the print-data manager 117 transmits a print-data-transfer-request-message indicative of a request of transmission of the specified print-data to the other printers 110 (e.g., 110b, . . . , 110x) through the communication controller 123. The print-data manager 117 acquires the necessary print-data from the other printers 110 (e.g., 110b, . . . , 110x) as a response to the print-data-transfer-request-message.

When receiving the search-response-message from the other printers 110 (e.g., 110b, . . . , 110x), the print-data manager 117 extracts the authentication-information from the search-response-message. The print-data manager 117 searches the print-data storage 118 for the print-data having the authentication-information corresponding to the extracted authentication-information. When finding the print-data having the authentication-information coinciding with the extracted authentication-information, the print-data manager 117 transmits the search-request-response-message including print-data-identification-information for specifying the found print-data through the communication controller 123 to the transmission originator of the search-response-message.

Further, when receiving the print-data-transfer-request-message from the other printers 110 (e.g., 110b, . . . , 110x) through the communication controller 123, the print-data manager 117 reads out print-data as a transfer-request target from the print-data storage 118. The print-data manager 117 then transmits a print-data-transfer-request-response-message including the read-out print-data to the printer as the transmission originator of the print-data-transfer-request-message through the communication controller 123. The print-data manager 117 deletes the print-data as the transfer-request target from the print-data storage 118.

The print-data storage 118 stores the print-data therein. The temporary memory 119 stores information necessary for the operation of the print-data manager 117. In the first embodiment, for example, the temporary memory 119 stores print-data-identification-information specifying the print-data having the authentication-information coinciding with the authentication-information received from the authenticator 120.

The authenticator 120 generates authentication-information on the basis of an input from the user of the printer 110a. For example, the authenticator 120 receives user's input and generates the authentication-information on the basis of the user's input. The authenticator 120 may have such an authentication device as a card reader, by which the authenticator 120 can acquire necessary information from the user and can generate the authentication-information. In this case, the authentication-information is, for example, a user ID such as user's company employee number, a combination of such a user ID and an arbitrary password such as a PIN (personal identification number), a serial number of an IC card (an authentication medium processed by the user), user's biological information (e.g., fingerprint), or an arbitrary information arbitrarily set by the user.

The UIF 121 is an interface between the printer 110a and the user of the printer 110 (e.g., 110a). The UIF 121 may be such an interface as a combination of a display and a key switch, a combination of a display and a key switch, or such an interface as a touch panel display which can provide an output to the user and can receive an input from the user.

The printing unit 122 performs its printing operation on the basis of the print-data according to an instruction from the print-data manager 117. For example, when the printer 110 (e.g., 110a) is an electrophotographic printer, the printing unit 122 rasterizes the print-data, forms an electrostatic latent image on a photosensitive drum, deposits toners on the electrostatic latent image to form a toner image, and transfers the toner image onto a recording paper.

The communication controller 123 transmits and receives information to and from the network 150.

The above-described searcher 112, the search responder 113, the operation confirmer 115, the operation-confirmation responder 116 and the print-data manager 117 can be implemented, for example, by a CPU (central processing unit) which reads out a program from a nonvolatile memory such as a flash memory or from a storage unit such as a hard disc drive and executes the program. The own-apparatus-information memory 111, the printer-information memory 114, the print-data storage 118 and the temporary memory 119 can be implemented, for example, by a nonvolatile memory such as a flash memory or a storage unit such as a hard disc drive. The UIF 121 can be implemented by an input device such as a key device and a display device such as a liquid crystal display, a touch panel display device, or the like. The communication controller 123 can be implemented by a network interface card (NIC).

Figure 4:
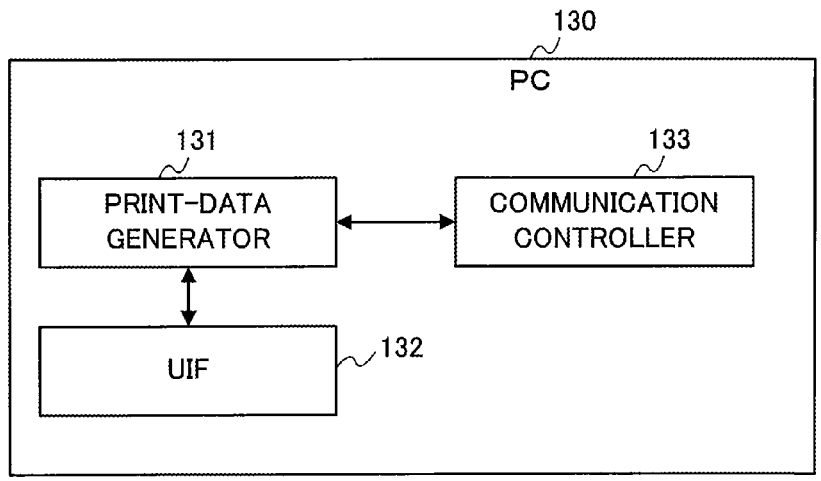
FIG. 4 is a block diagram schematically showing an arrangement of a personal computer (PC) in the first embodiment.

FIG. 4 is a block diagram schematically showing an arrangement of the PC 130. The PC 130 includes a print-data generator 131 as an image-information generator, a user interface (UIF) 132 and a communication controller 133.

The print-data generator 131 generates print-data. For example, when the user of the PC 130 issues a print instruction through the UIF 132, the print-data generator 131 generates print-data on the basis of the instruction. In this connection, when the user of the PC 130 issues an instruction that authentication-information is not attached to print-data through the UIF 132, execution of immediate printing is selected based on the print-data. When the user of the PC 130 issues an instruction that authentication-information is attached to print-data through the UIF 132, execution of printing based on the print-data after authentication of the printer 110 is selected.

The print-data generator 131 transmits the generated print-data to the printer 110 through the communication controller 133. For example, the print-data generator 131 transmits the generated print-data to the printer 110 selected by the user of the PC 130 through the UIF 132. In this case, since the printers 110 (e.g., 110a, 110b, . . . , 110x) are divided into printer-groups based on passphrases, the user of the PC 130 can select the printer-group used for printing based on the print-data by selecting any of the printers 110 as a transmission-destination.

Figure 5:
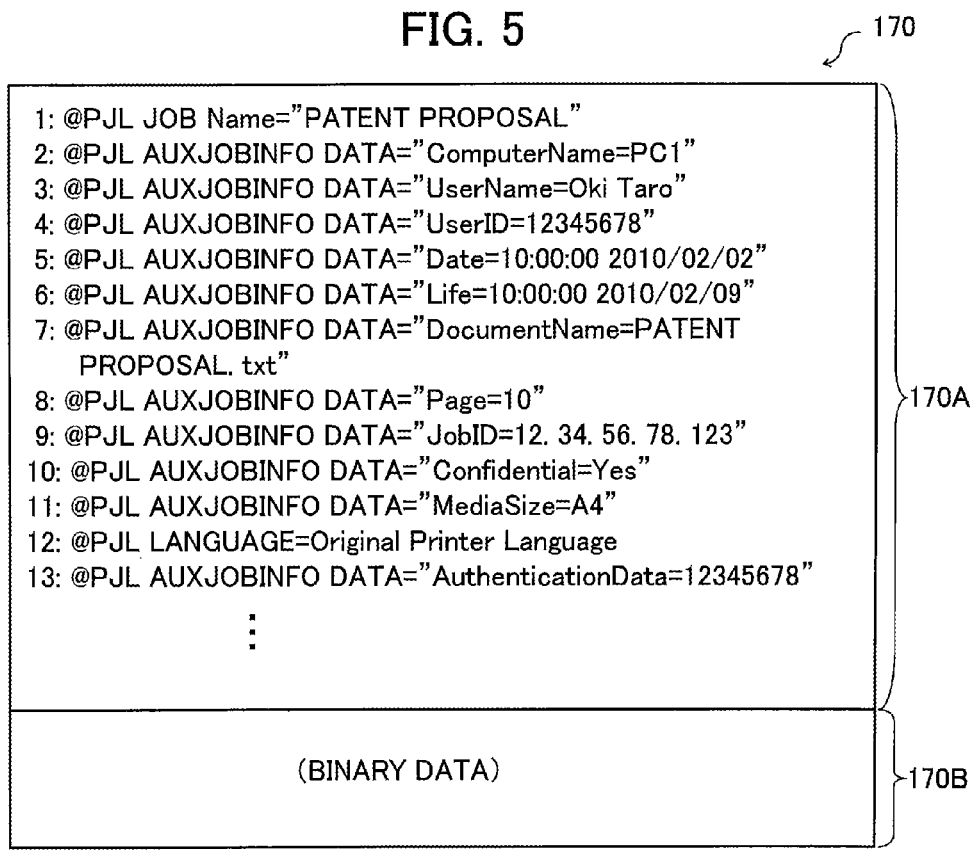
FIG. 5 is a diagram showing an example of print-data in the first embodiment.

FIG. 5 is a diagram schematically showing an example of print-data 170. The print-data 170 includes control data 170A as text data and entity data 170B as binary data. In the control data 170A shown in FIG. 5, numbers at left line ends and marks "colon" next thereto are added to show line numbers for explanation, and these are not included in the control data 170A. The control data 170A is a set of characters based on PJL (printer job language) and is plain text data. Each line in the control data 170A is described by "@PJL" at the head of the line which is followed by "variable name" and then by "=variable contents". Variables indicated by "AUX-JOBINFO DATA" on lines 2 to 11 and on a line 13 are extended variables. The contents of the extended variable further include a variable name and its contents. In FIG. 5, more in detail, the contents of the control data 170A are as follows.

Line 1 represents "JOB NAME" as a name for identification of the print-data 170.

Line 2 represents an extended variable of "ComputerName" as a name for identification of the PC 130 which generated the print-data 170.

Line 3 represents an extended variable of "UserName" as a user name of the PC 130 which generated the print-data 170.

Line 4 represents an extended variable of "UserID" as a user ID for identification of the user of the PC 130 which generated the print-data 170.

Line 5 represents an extended variable of "Date" indicative of a data of generation of the print-data 170.

Line 6 represents an extended variable of "Life" as an effective expiration date of the print-data 170.

Line 7 represents an extended variable of "DocumentName" as a file name of a file in the PC 130.

Line 8 represents an extended variable of "Page" indicative of the number of pages issued when the print-data 170 was printed.

Line 9 represents an extended variable of "JobID" indicative of an ID of a job for printing the print-data 170. The value of "JobID" is generated by combining inherent information of the PC 130 and serial numbers generated by the PC 130 and is not overlapped with the other print-data 170.

Line 10 represents an extended variable of "Confidential" indicative of necessity or non-necessity of authentication upon printing of the print-data 170, and in other words, indicative of whether or not the print-data 170 is authenticated print-data. When "Confidential" has a value of "YES", this means that authentication is necessary: whereas, when "Confidential" has a value of "NO", authentication is unnecessary.

Line 11 represents an extended variable of "MediaSize" indicative of a request size of a medium required by the print-data 170, Line 12 represents an extended variable of "LANGUAGE" indicative of a language of the entity data 170B included in the print-data 170, and Line 13 represents an extended variable of "AuthenticationDate" indicative of authentication-information of the print-data 170. When the user of the PC 130 issued an instruction of no attachment of the authentication-information, the extended variable on line 13 is not described.

In the first embodiment, the control data 170A is text data and the entity data 170B is binary data. In place of this example, the control data 170A may be binary data and the entity data 170B may be text data, for example.

The UIF 132 is an interface between the PC 130 and the user of the PC 130. The communication controller 133 transmits and receives information to and from the network 150.

The above-described print-data generator 131 can be implemented when the CPU reads out a program from a hard disc drive and from a memory such as a ROM and executes the program. The UIF 132 can be implemented when the CPU uses an input device such as a keyboard and a mouse, a display device, a touch panel display, or the like. The communication controller 154 can be implemented when the CPU uses a NIC.

Figure 6:
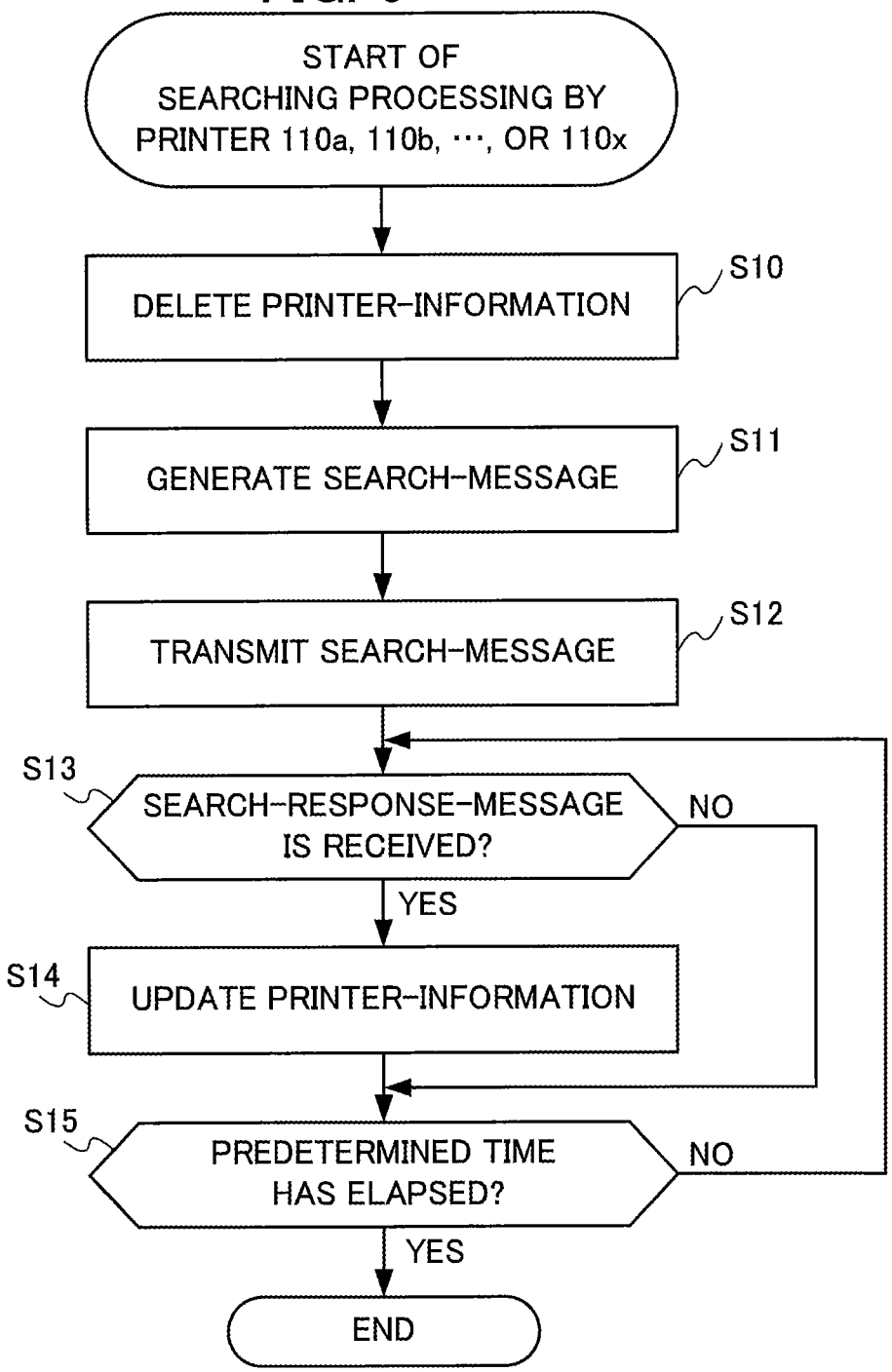
FIG. 6 is a flowchart showing searching processing of the printer according to the first embodiment.

FIG. 6 is a flowchart showing searching processing in which the printer 110 (e.g., 110a) searches the other printers 110 (e.g., 110b, ..., 110x) in the first embodiment. Processing of FIG. 6 starts when the printer 110a is started-up or activated and connected to the network 150. When the user of the printer 110a issues a search instruction through the UIF or when the operation confirmer 115 determines the searching, processing of FIG. 6 is started.

The searcher 112 deletes all apparatus-information recorded in the printer-information 114a (step S10).

Next, the searcher 112 of the printer 110 (e.g., 110a) generates a search-message for searching the other printers 110 (e.g., 110b, ..., 110x) (step S11). The search-message includes the identification-information of the printer 110a as the search originator and information indicative of a fact that the search-message was transmitted from the printer 110a. In the first embodiment, for example, identification-information indicative of being a printer is included in the printer-name. Thus, when the printer-name is included in the search-message, this means that the search-message was transmitted from any of the printers. Further, the search-message includes a passphrase. The passphrase is information having a character string such as "ABC". If necessary, the passphrase may include information about the type of the printer as the search originator, information about a printable maximum-paper-size, information about a toner-remaining-amount as a consumables-remaining-amount, or the like.

Next, the searcher 112 of the printer 110a transmits the search-message generated at step S11 through the communication controller 123 to the other printers 110 (e.g., 110b, ..., 110x) connected to the network 150 (step S12). For example, the searcher 112 transmits the search-message to the other printers 110 (e.g., 110b, ..., 110x) in the same segment by broadcasting. The searcher 112 may transmit the search-message to one or more of the other printers 110 (e.g., 110b, ..., 110x) on the basis of settings of the user of the printer 110a or the administrator of the image forming system 100 (e.g., the destination of the transmission set by the user or the administrator). Further, the searcher 112 may transmit the search-message to the other printers 110 (e.g., 110b, ..., 110x) belonging to a constant range of the network 150, on the basis of settings of the user of the printer 110a or the administrator of the image forming system 100 (e.g., the destination of the transmission set by the user or the administrator).

Next, the searcher 112 confirms whether or not to have acquired a search-response-message through the communication controller 123 in response to the search-message transmitted at step S12 (step S13). When the searcher 112 receives the search-response-message (YES at step S13), the processing proceeds to step S14. When the searcher 112 fails to acquire the search-response-message (NO at step S13), the processing proceeds to step S15.

At step S14, the searcher 112 records information included in the acquired search-response-message in the printer-information 114a. More specifically, the searcher 112 extracts the apparatus-information such as the identification-information of the printer of the transmission originator from the acquired search-response-message. The searcher 112 records the extracted apparatus-information in a corresponding column of the printer-information 114a. The searcher 112 of the printer 110a also sets operation-confirmation-information at "Confirmation Needed" (shown as a mark "O" in FIG. 3) in a row having the extracted apparatus-information.

Next, the searcher 112 confirms whether a predetermined time (e.g., 30 seconds) has elapsed from the transmission of the search-message at step S12 (step S15). If the predetermined time has elapsed (YES at step S15), the searcher 112 terminates its search processing. If the predetermined time has not elapsed (NO at step S15), the searcher 112 returns the search processing to step S13. The predetermined time can be set through the UIF 121 by the user of the printer 110a or the administrator of the image forming system 100.

As has been described above, the printer 110a (or 110) according to the first embodiment can search the other printers 110 (e.g., 110b, ..., 110x) connected to the network 150 at the time of start-up of the printer 110a, and can store apparatus-information of the other printers 110 (e.g., 110b, ..., 110x) that transmitted the search-response-message, in the printer-information 114a.

In the flowchart shown in FIG. 6, the searcher 112 waits for the elapse of the predetermined time at step S15. In place of this, for example, if the searcher 112 of the printer 110a determines acceptance of the search-response-message from all other printers 110 (e.g., 110b, . . . , 110x) as the transmission-destinations of the search-message, the searcher 112 of the printer 110a terminates processing of FIG. 6.

Figure 7:
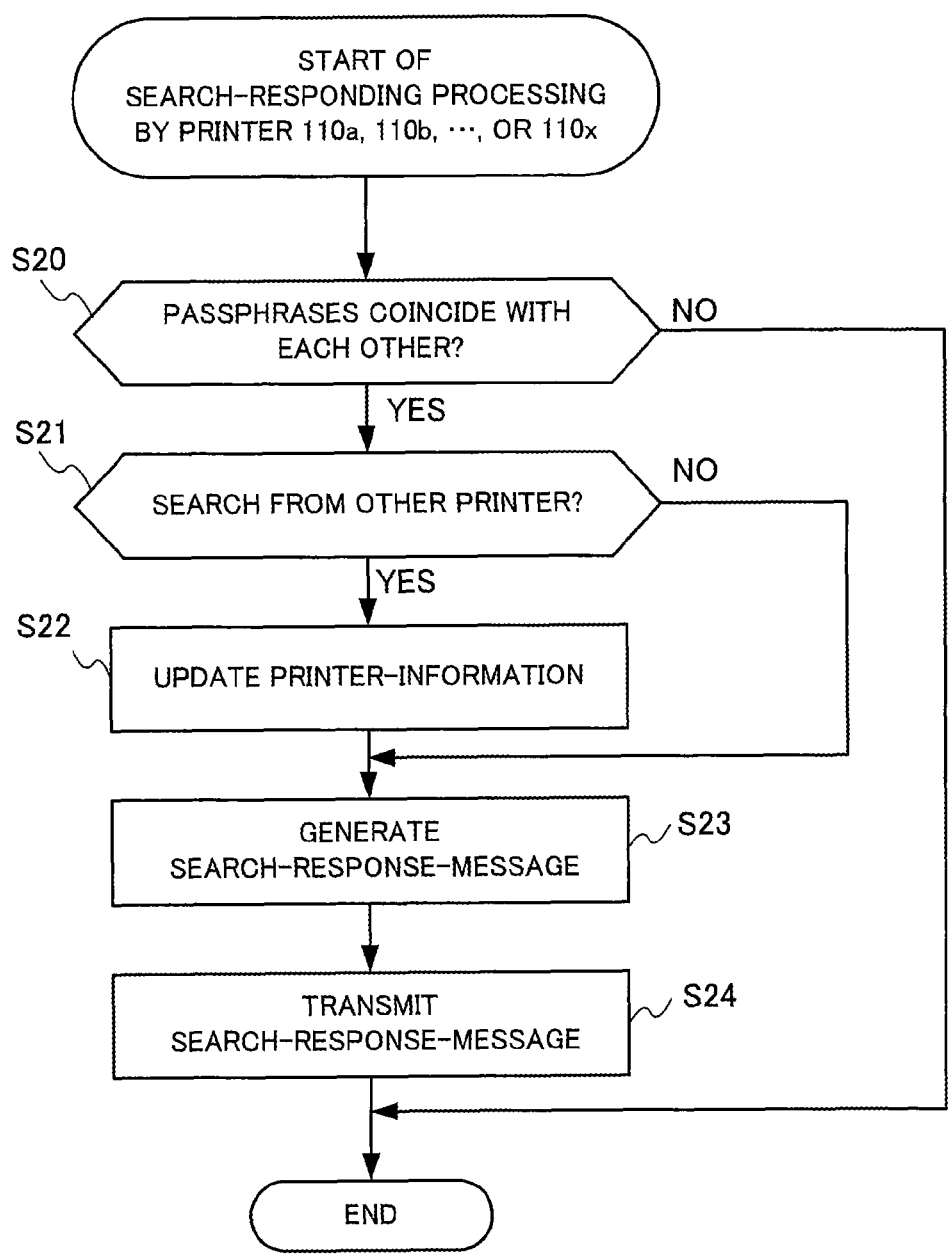
FIG. 7 is a flowchart showing responding processing of the printer according to the first embodiment.

FIG. 7 is a flowchart showing search-responding processing when the printer 110 (e.g., 110a) according to the first embodiment received the search-message. Processing of FIG. 7 is started when the search responder 113 of the printer 110 (e.g., 110a) acquired the search-message through the communication controller 123.

The search responder 113 extracts the passphrase from the acquired search-message. The search responder 113 also confirms whether or not the extracted passphrase coincides with the passphrase stored in the own-apparatus-information memory 111, in other words, whether or not the extracted passphrase coincides with the passphrase set for the own-apparatus (step S20). When determining that the passphrases coincide with each other (YES at step S20), the search responder 113 advances the processing to step S21. When determining that the passphrases do not coincide with each other (NO at step S20), the search responder 113 terminates the processing.

At step S21, the search responder 113 confirms whether or not the transmission originator of the search-message is the printer 110a. For example, the search responder 113 confirms the transmission originator of the search-message is the printer 110a based on the printer-name included in the search-message. When the transmission originator of the search-message is the printer 110a (YES at step S21), the search responder 113 advances the processing to step S22. When the transmission originator of the search-message is not the printer 110a (NO at step S21), the search responder 113 advances the processing to step S23.

At step S22, the search responder 113 refers to the acquired search-message and updates the printer-information 114a. More specifically, the search responder 113 extracts identification-information for the printer 110a of the transmission originator from the acquired search-message. The search responder 113 specifies apparatus-information recorded in the printer-information 114a, which corresponds to the extracted identification-information. In the specified apparatus-information, the search responder 113 sets the operation-confirmation-information as "Confirmation Needed" (shown as a mark "O" in FIG. 3), and updates information other than the operation-confirmation-information so as to coincide with contents of the apparatus-information included in the search-message.

At step S23, the search responder 113 generates a search-response-message. The search responder 113 inserts the identification-information of the own-apparatus in the search-response-message. The search responder 113 may also insert apparatus-information of the own-apparatus in the search-response-message.

The search responder 113 of the printer 110 (e.g., 110a) transmits the search-response-message generated at step S23 to the printer 110 (e.g., 110b, . . . , 110c) of the search originator through the communication controller 123 (step S24).

As has been described above, the printer 110 (e.g., 110a) according to the first embodiment responds to the search by transmitting the search-response-message when receiving the search-message. When receiving a search from the other printers 110 (e.g., 110b, . . . , 110c), the printer 110a according to the first embodiment can put the information of the printer 110 (e.g., 110a) of the search originator in its latest state by updating the contents of the printer-information 114a.

Figure 8:
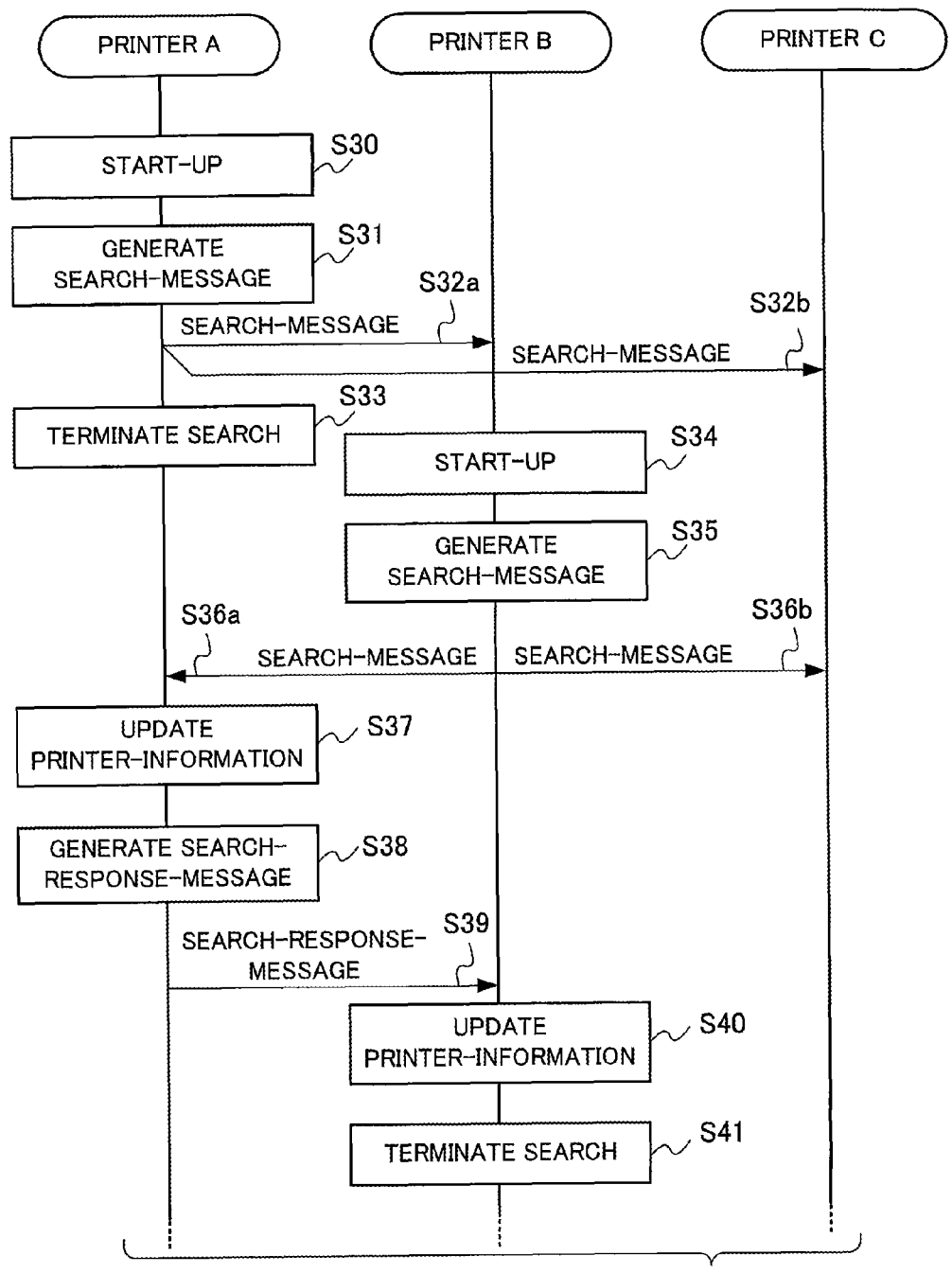
FIG. 8 is a sequence diagram showing a first example of a searching operation which is performed by three printers connected to the same network in the first embodiment.
Figure 9:
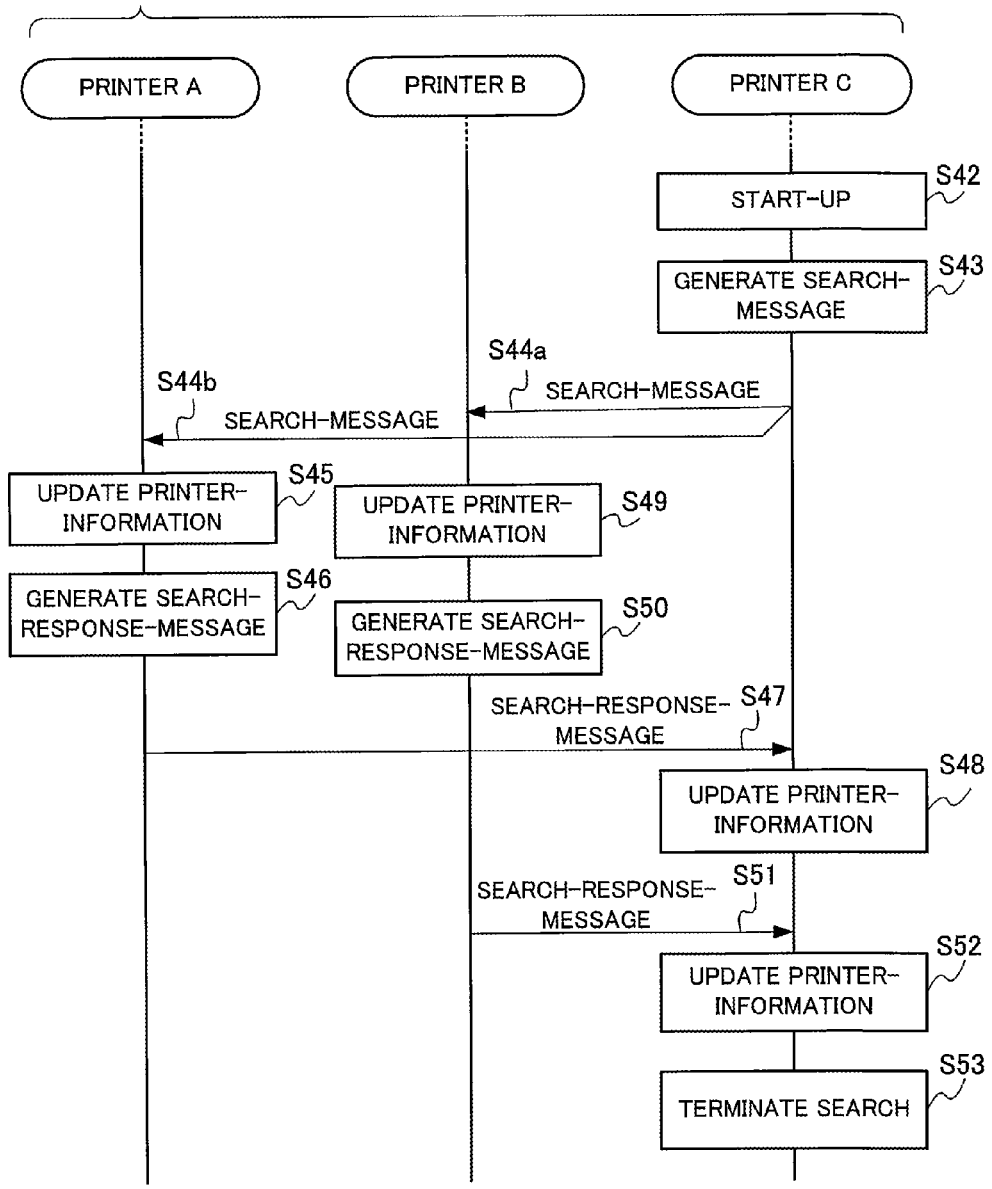
FIG. 9 is a sequence diagram showing the first example of the searching operation continued from FIG. 8.

FIGS. 8 and 9 are sequence diagrams showing searching processing when three printers connected to the same network 150 perform their searching processing in the first embodiment. In FIGS. 8 and 9, three printers A, B and C are connected to the network 150. Explanation will be made in connection with a case where the printers A, B and C are started-up or activated in this order. In this case, passphrases set for the respective printers A, B and C are the same.

First of all, the printer A is activated and connected to the network 150 (step S30). At this time, apparatus-information is not recorded in the printer-information 114a stored in the printer-information memory 114 of the printer A.

The searcher 112 of the printer A generates a search-message (step S31). The searcher 112 of the printer A transmits the generated search-message through the communication controller 123 to the printers B and C (steps S32a and S32b).

The printers B and C do not transmit a search-response-message because they are not activated yet. For this reason, after elapse of a predetermined time from the transmission of the search-message, the searcher 112 of the printer A terminates its searching processing (step S33).

Next, the printer B is activated and connected to the network 150 (step S34). At this time, apparatus-information is not recorded in the printer-information 114a stored in the printer-information memory 114 of the printer B.

The searcher 112 of the printer B generates a search-message (step S35). The searcher 112 of the printer B transmits the generated search-message through the communication controller 123 to the printers A and C (steps S36a and S36b).

In the printer A when receiving the search-message, the search responder 113 updates the printer-information 114a on the basis of the apparatus-information included in the search-message (step S37). In this way, the printer A holds the apparatus-information of the printer B.

The search responder 113 of the printer A generates a search-response-message as a response to the search-message (step S38).

The search responder 113 of the printer A transmits the generated search-response-message through the communication controller 123 to the printer B (step S39).

In the printer B when receiving the search-response-message, the searcher 112 updates the printer-information 114a on the basis of the apparatus-information included in the search-response-message (step S40). In this way, the printer B holds the apparatus-information of the printer A.

At this time, because the printer C is not activated yet, the printer C transmits no search-response-message. The searcher 112 of the printer B terminates its searching processing after elapse of a predetermined time from the transmission of the search-message (step S41).

Next, processing proceeds to a sequence shown in FIG. 9. The printer C is next activated and connected to the network 150 (step S42). At this time, the apparatus-information is not recorded in the printer-information 114a stored in the printer-information memory 114 of the printer C.

The searcher 112 of the printer C generates a search-message (step S43). The searcher 112 of the printer C transmits the generated search-message through the communication controller 123 to the printers A and B (steps S44a and S44b).

In the printer A when receiving the search-message, the search responder 113 updates the printer-information 114a on the basis of the apparatus-information included in the search-message (step S45). In this way, the printer A holds the apparatus-information of the printer C.

The search responder 113 of the printer A generates a search-response-message as a response to the search-message (step S46).

The search responder 113 of the printer A transmits the generated search-response-message through the communication controller 123 to the printer C (step S47).

In the printer C when receiving the search-response-message, the searcher 112 updates the printer-information 114a on the basis of the apparatus-information included in the search-response-message (step S48). In this way, the printer C holds the apparatus-information of the printer A.

In the printer B when receiving the search-message, the search responder 113 updates the printer-information 114a on the basis of the apparatus-information included in the search-message (step S49). In this way, the printer B holds the apparatus-information of the printer C.

The search responder 113 of the printer B generates a search-response-message as a response to the search-message (step S50).

The search responder 113 of the printer B transmits the generated search-response-message through the communication controller 123 to the printer C (step S51).

In the printer C when receiving the search-response-message, the searcher 112 updates the printer-information 114a on the basis of the apparatus-information included in the search-response-message (step S52). In this way, the printer C holds the apparatus-information of the printer B.

After that, the searcher 112 of the printer C terminates its searching processing after elapse of predetermine time from the transmission of the search-message (step S53).

In this way, the activated printer 110 (e.g., 110a) searches the other printers 110 (e.g., 110b, ..., 110x) connected to the network 150 to collect the apparatus-information of the other printers 110 (e.g., 110b, ..., 110x). Since when receiving the search-message, the other printers 110 (e.g., 110b, ..., 110x) also hold the apparatus-information of the searching printer 110, all the printers 110 (e.g., 110a) connected to the network 150 can hold the apparatus-information of the other printers 110 (e.g., 110b, ..., 110x) connected to the network 150. In this connection, a printer-group of such printers 110 (e.g., 110a, 110b, ..., 110x) mutually holding the apparatus-information of the printers 110 (e.g., 110a, 110b, ..., 110x) will be referred to as a printer-group. In the examples shown in FIGS. 8 and 9, the printers A, B and C belong to the same printer-group.

Figure 10:
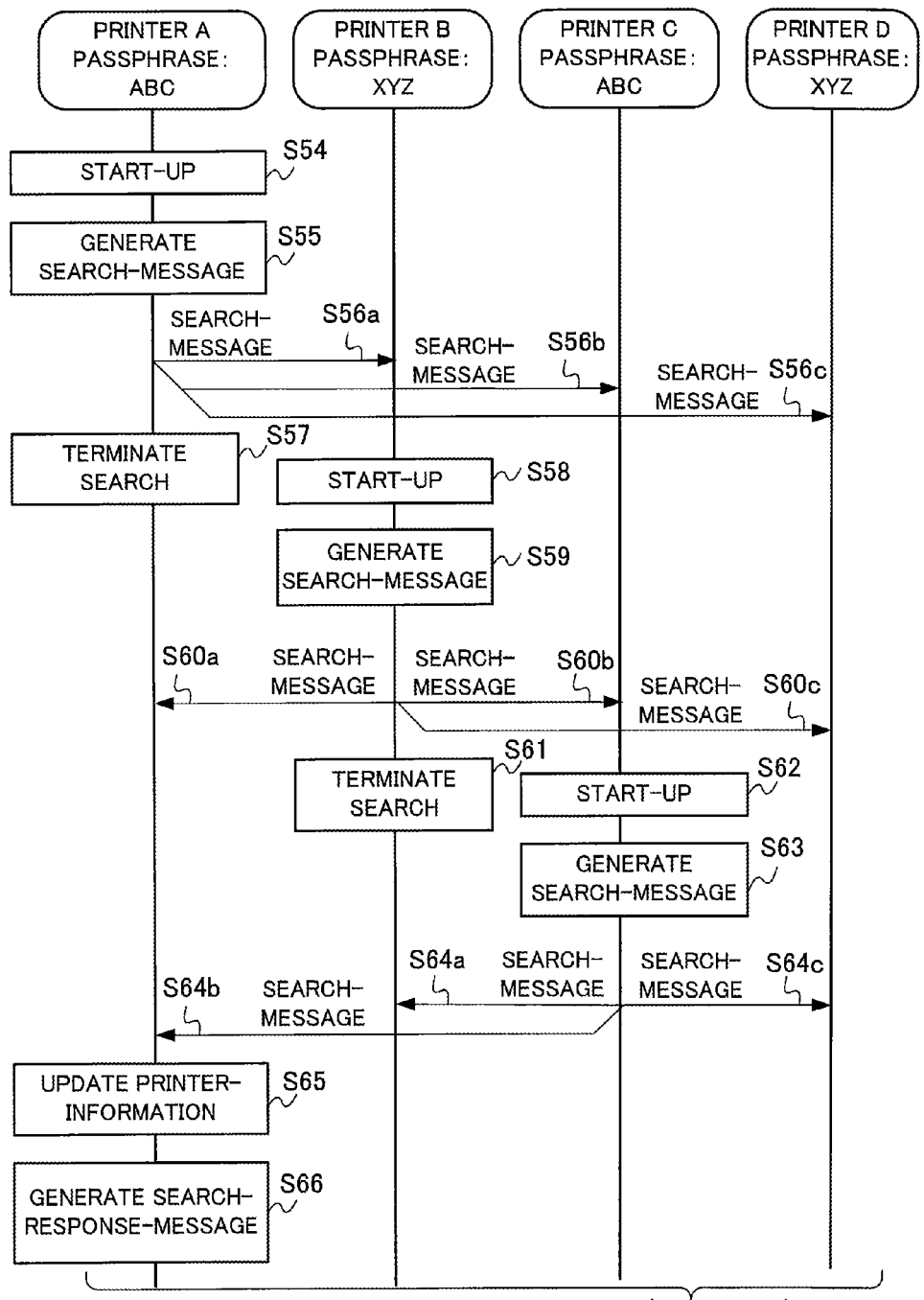
FIG. 10 is a sequence diagram showing a second example of a searching operation which is performed by four printers connected to the same network in the first embodiment.
Figure 11:
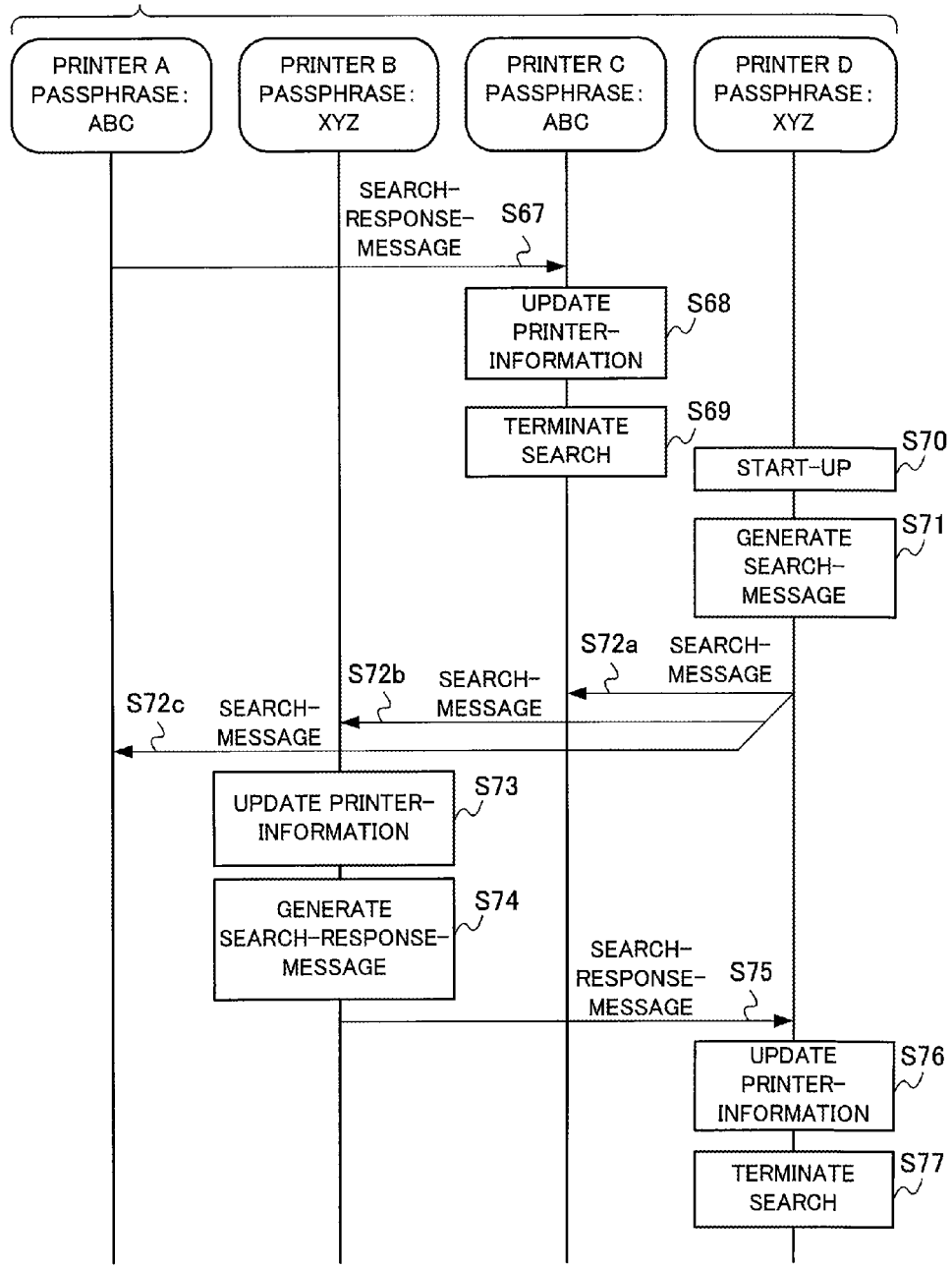
FIG. 11 is a sequence diagram showing the second example of the searching operation continued from FIG. 10.

FIGS. 10 and 11 are sequence diagrams showing processing when four printers connected to the same network 150 perform their searching processing in the first embodiment. In FIGS. 10 and 11, four printers A, B, C and are connected to the network 150. The printers A, B, C and D are started-up or activated in this order. It is assumed that passphrases set for the printers A and B are "ABC" and passphrases set for the printers B and D are "XYZ".

First of all, the printer A is activated and connected to the network 150 (step S54). At this time, the apparatus-information is not recorded in the printer-information 114a stored in the printer-information memory 114 of the printer A.

The searcher 112 of the printer A generates a search-message including the passphrase "ABC" (step S55). The searcher 112 of the printer A transmits the generated search-message through the communication controller 123 to the printers B, C and D (steps S56a, S56b and S56c).

Since the printers B, C and D are not activated yet, these printers transmit no search-response-message. The searcher 112 of the printer A terminates its searching processing after elapse of a predetermined time from the transmission of the search-message (step S57).

The printer B is next activated and connected to the network 150 (step S58). At this time, the apparatus-information is not recorded in the printer-information 114a stored in the printer-information memory 114 of the printer B.

The searcher 112 of the printer B generates a search-message including the passphrase "XYZ" (step S59). The searcher 112 of the printer B transmits the generated search-message through the communication controller 123 to the printers C and D (steps S60a, S60b and S60c).

In the printer A when receiving the search-message, the search responder 113 determines whether or not the passphrase "XYZ" included in the search-message coincides with the passphrase "ABC" of the own-apparatus. In this case, since no coincidence of these passphrases is found, the search responder 113 performs no updating processing of the printer-information 114a and does not generate a search-response-message nor transmit the message.

The printers C and D, which are not activated yet, transmit no search-response-message. For this reason, the searcher 112 of the printer B terminates its searching processing after elapse of a predetermined time from the transmission of the search-message (step S61).

Next, the printer C is activated and connected to the network 150 (step S62). At this time, the apparatus-information is not recorded in the printer-information 114a stored in the printer-information memory 114 of the printer C.

The searcher 112 of the printer C generates a search-message including the passphrase "ABC" (step S63). The searcher 112 of the printer C transmits the generated search-message through the communication controller 123 to the printers A, B and D (steps S64a, S64b and S64c).

The search responder 113 of the printer A when receiving the search-message determines whether or not the passphrase "ABC" included in the search-message coincides with the passphrase "ABC" of the own-apparatus. At this time, because of a coincidence of the passphrases, the search responder 113 updates the printer-information 114a on the basis of the apparatus-information included in the search-message (step S65). In this way, the printer A holds the apparatus-information of the printer C.

The search responder 113 of the printer A generates a search-response-message as a response to the search-message (step S66).

Next, processing goes to a sequence diagram shown in FIG. 11. The search responder 113 of the printer A transmits the generated search-response-message through the communication controller 123 to the printer C (step S67).

When receiving the search-response-message, the searcher 112 of the printer C updates the printer-information 114a on the basis of the apparatus-information included in the search-response-message (step S68). In this way, the printer C holds the apparatus-information of the printer A.

The search responder 113 of the printer B when receiving the search-message determines whether or not the passphrase "ABC" included in the search-message coincides with the passphrase "XYZ" of the own-apparatus. At this time, because of no coincidence of the passphrases, the search responder 113 does not perform updating processing of the printer-information 114a nor generating and transmitting processing of the search-response-message.

Since the printer D is not activated yet, the printer transmits no search-response-message. For this reason, the searcher 112 of the printer C terminates its searching processing after elapse of a predetermined time from the transmission of the search-message (step S69).

Next, the printer D is activated and connected to the network 150 (step S70). At this time, the apparatus-information is not recorded in the printer-information 114a stored in the printer-information memory 114 of the printer D.

The searcher 112 of the printer D generates a search-message including the passphrase "XYZ" (step S71). The searcher 112 transmits the generated search-message through the communication controller 123 to the printers B and C (steps S72a, S72b and S72c).

The search responder 113 of the printers A and C when receiving the search-message determines whether or not the passphrase "XYZ" included in the search-message coincides with the passphrase "ABC" of the own-apparatus. At this time, because no coincidence of the passphrases, the search responder 113 does not perform updating processing of the printer-information 114a nor generating and transmitting processing of the search-response-message.

When the printer B received the search-message, the search responder 113 of the printer B determines whether or not the passphrase "XYZ" included in the received search-message coincides with the passphrase "XYZ" of the printer B as the own-apparatus. When the passphrase "XYZ" included in the received search-message coincides with that of the printer B, the search responder 113 of the printer B updates the printer-information 114a on the basis of the apparatus-information included in the search-message (step S73). In this way, the printer B holds the apparatus-information of the printer D.

The search responder 113 of the printer B generates a search-response-message as a response to the search-message (step S74). Then, the search responder 113 of the printer B transmits the generated search-response-message through the communication controller 123 to the printer D (step S75).

When the printer D receives the search-response-message, the searcher 112 in the printer D updates the printer-information 114a on the basis of the apparatus-information included in the received search-response-message (step S76). In this way, the printer D holds the apparatus-information of the printer B. Then, the searcher 112 of the printer D terminates its searching processing after elapse of a predetermined time from the transmission of the search-message (step S77).

As has been described above, when a plurality of printers connected to the network 150 use a plurality of passphrases, a plurality of printer-groups such as a printer-group of the printers A and C and another printer-group of printers B and D, for example, can be formed in the network 150.

Figure 12:
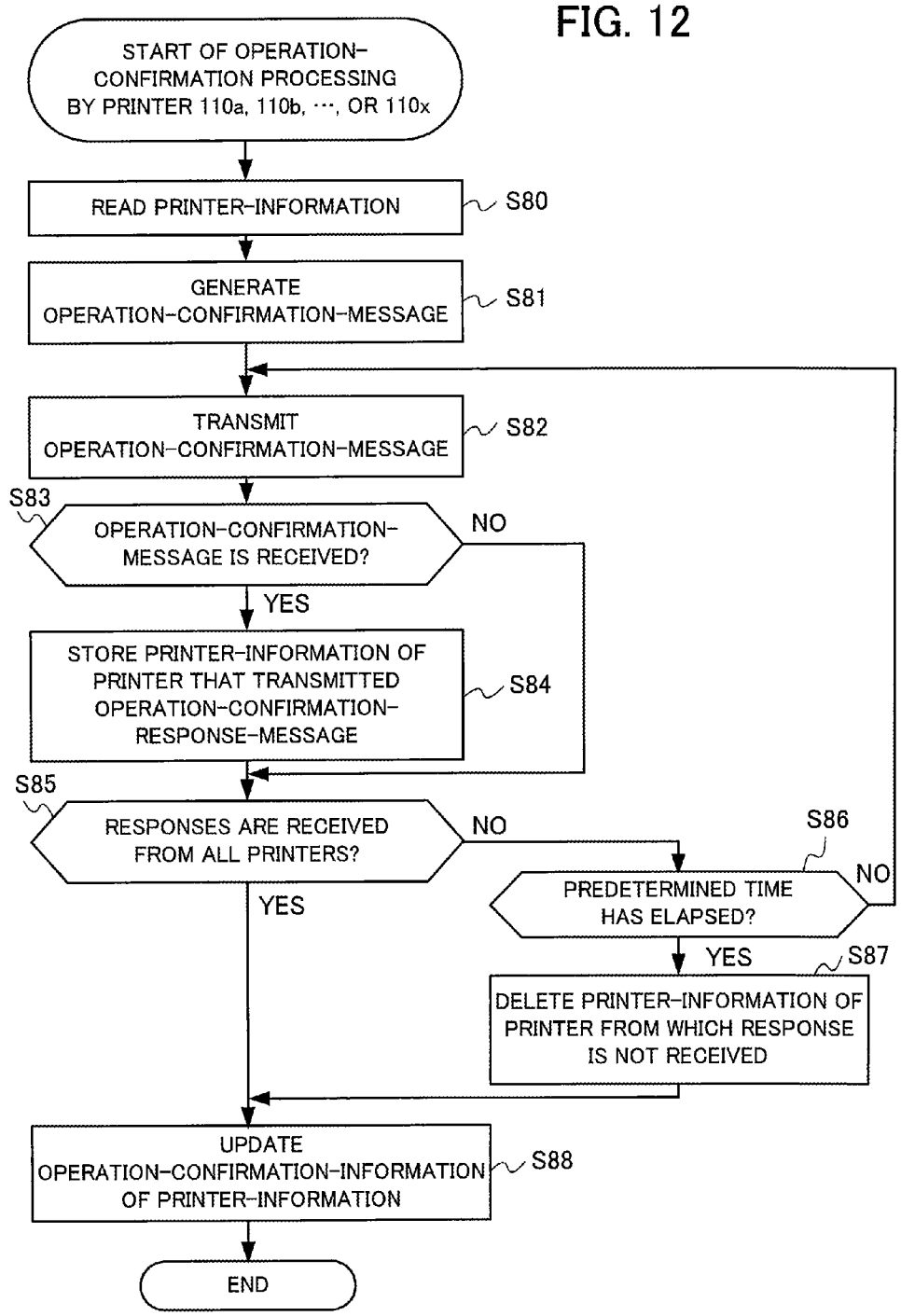
FIG. 12 is a flowchart showing operation-confirmation processing in which a printer belonging to a printer-group confirms whether or not the other printers belonging to the same printer-group are normally operating in first embodiment.

FIG. 12 is a flowchart showing processing in which the printer 110 (e.g., 110a) as the own-apparatus according to the first embodiment confirms whether or not the other printers 110 (e.g., 110b, ..., 110x) belonging to the same printer-group as the own-apparatus are normally operating. Processing of FIG. 12 is started at intervals of a predetermined time, for example, after end of the searching processing of the other printers 110 (e.g., 110b, ..., 110x) shown in FIG. 6.

The operation confirmer 115 refers to the printer-information 114a and specifies the other printers 110 (e.g., 110b, ..., 110x) belonging to the same printer-group as the own-apparatus and having operation-confirmation-information set at "Confirmation Needed" (shown as a mark "O" in FIG. 3) (step S80). In this case, the operation confirmer 115 of the printer 110 (e.g., 110a) previously acquires IP-addresses of the other printers 110 (e.g., 110b, ..., 110x).

Next, the operation confirmer 115 generates an operation-confirmation-message including the identification-information of the own-apparatus (step S81). The operation confirmer 115 may insert the consumables-status-information of the own-apparatus such as maximum-paper-sizes in the operation-confirmation-message. The operation confirmer 115 further may insert printer-status-information as the status-information of the own-apparatus in the operation-confirmation-message.

The operation confirmer 115 then transmits the operation-confirmation-message generated at step S81 through the communication controller 123 to the other printers 110 (e.g., 110b, ..., 110x) connected to the network 150 (step S82). The operation confirmer 115 transmits the operation-confirmation-message only to the other printers 110 (e.g., 110b, ..., 110x) specified at step S80, in other words, only to the printers 110 (e.g., 110b, ..., 110x) belonging to the same printer-group as the own-apparatus and requiring operation-confirmation.

The operation confirmer 115 next confirms whether or not to have acquired an operation-confirmation-response-message as a message as a response to the operation-confirmation-message transmitted at step S82 (step S83). When the operation confirmer 115 acquired the operation-confirmation-response-message (YES at step S83), the operation confirmer 115 advances the processing to step S84. When the operation confirmer 115 fails to acquires the operation-confirmation-response-message (NO at step S83), the operation confirmer 115 advance the processing to step S85.

At step S84, the operation confirmer 115 updates the apparatus-information of the other printers 110 (e.g., 110b, ..., 110x) as the transmission originators of the operation-confirmation-response-message acquired at step S83 in the printer-information 114a. More specifically, the operation confirmer 115 extracts the identification-information of any of the printers 110 (e.g., 110b, ..., 110x) as the transmission originators from the acquired operation-confirmation-response-message. The searcher 112 also specifies the apparatus-information recorded in the printer-information 114a which corresponds to the extracted identification-information. The searcher 112 sets the operation-confirmation-information at "Confirmation Needed" (shown as a mark "O" in FIG. 3) in the specified apparatus-information and sets information other than the operation-confirmation-information so as to coincide with the contents of the apparatus-information included in the operation-confirmation-response-message.

At step S85, the operation confirmer 115 confirms whether or not to have acquired the operation-confirmation-response-message from all the printers 110 (e.g., 110b, ..., 110x) having transmitted the operation-confirmation-message at step S82 through the communication controller 123. When the operation confirmer 115 acquired the operation-confirmation-response-message from all the printers 110 (e.g., 110b, ..., 110x) having transmitted the operation-confirmation-message (YES at step S85), the operation confirmer 115 advances the processing to step S88. When the operation confirmer 115 fails to acquire the operation-confirmation-response-messages from all the printers 110 (e.g., 110b, ..., 110x) having transmitted the operation-confirmation-message (NO at step S85), namely, when the operation-confirmation-response-messages are not transmitted from any of the printers 110 (e.g., 110b, ..., 110x), the operation confirmer 115 advances the processing to step S86.

At step S86, the operation confirmer 115 transmits the operation-confirmation-message at step S82 and then confirms elapse or non-elapse of a predetermined time from the transmission of the operation-confirmation-message at step S82. When the operation confirmer 115 confirms elapse of the predetermined time (YES at step S86), the operation confirmer 115 advances the processing to step S87. When the operation confirmer 115 confirms non-elapse of the predetermined time (NO at step S86), the operation confirmer returns the processing to step S83.

At step S87, the operation confirmer 115 deletes the apparatus-information of the printer or printers, which do not transmit the operation-confirmation-response-message to the operation confirmer 115, from the printer-information 114a.

At step S88, the operation confirmer 115 updates the operation-confirmation-information 114e of the printer-information 114a so that operation-confirmation-information 114e is set to be "Confirmation Needed" (shown as a mark "O" in FIG. 3) for all the printers 110 (e.g., 110b, . . . , 110x).

As has been described above, when the printer 110 (e.g., 110a) according to the first embodiment transmits the other printers 110 (e.g., 110b, . . . , 110x) belonging to the same printer-group as the own-apparatus and confirms the presence or absence of reception of the operation-confirmation-response-message, the printer 110 (e.g., 110a) can know whether or not the other printers 110 (e.g., 110b, . . . , 110x) belonging to the printer-group are normally operating. Furthermore, the printer 110 (e.g., 110a) deletes the apparatus-information of any of the printers 110 (e.g., 110b, . . . , 110x), which are not in normal operation, from the printer-information 114a, so that any of the printers 110 (e.g., 110b, . . . , 110x) that are not in normal operation are removed from the printer-group.

In the flowchart shown in FIG. 12, the operation confirmer 115 deletes the apparatus-information of any of the printers 110 (e.g., 110b, . . . , 110x), which does not transmit the operation-confirmation-response-message, from the printer-information 114a at step S87. In place of this example, for example, when there is any printer failing to transmit the operation-confirmation-response-message, the operation confirmer 115 may delete all the apparatus-information from the printer-information 114a and again may search the other printers 110 (e.g., 110b, . . . , 110x) connected to the network 150 according to the flowchart shown in FIG. 4 by issuing an instruction to the searcher 112.

The processing of the flowchart shown in FIG. 12 is started at intervals of a predetermined time. In place of the above example, when the operation confirmer 115 receives, for example, an instruction from the user through the UIF 121 or receives an external instruction, e.g., from another device connected to the network 150, the processing of the flowchart shown in FIG. 12 may be started.

Figure 13:
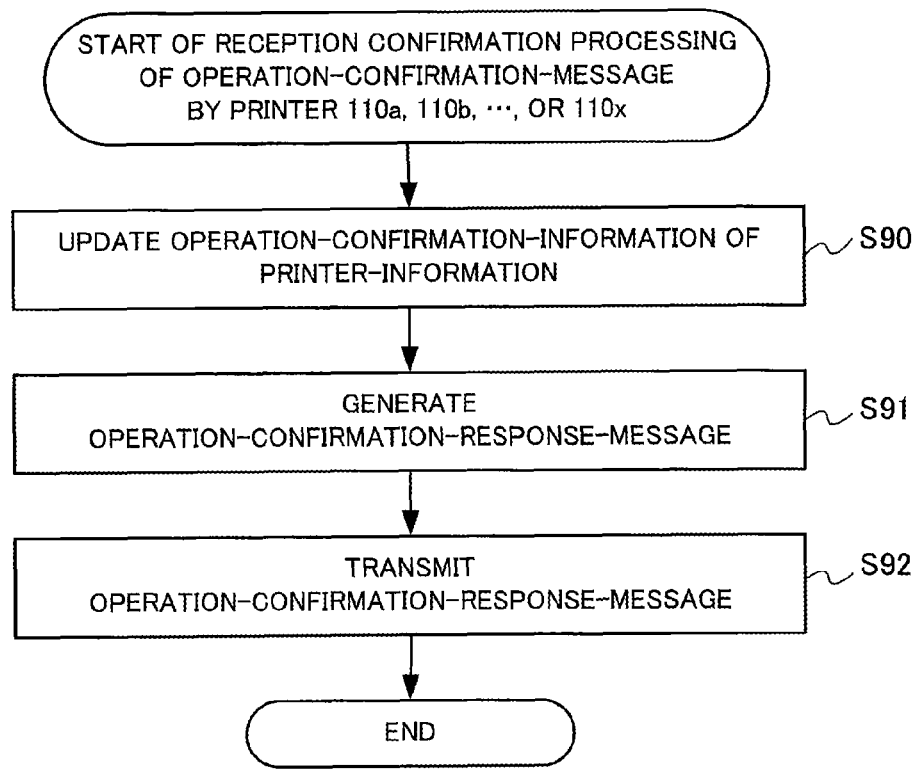
FIG. 13 is a flowchart showing reception confirmation processing of the printer when the printer receives an operation-confirmation-message in first embodiment.

FIG. 13 is a flowchart showing processing when the printer 110 (e.g., 110a) according to the first embodiment received the operation-confirmation-message. A flow shown in FIG. 13 is started when the operation-confirmation responder 116 of the printer 110 (e.g., 110a) acquired the operation-confirmation-message through the communication controller 123.

The operation-confirmation responder 116 of the printer 110 (e.g., 110a), when acquiring the operation-confirmation-message through the communication controller 123, updates the operation-confirmation-information of the printer 110 (e.g., 110b, . . . , 110x) as the transmission originator of the operation-confirmation-message in the printer-information 114a (step S90). More specifically, the operation-confirmation responder 116 modifies the operation-confirmation-information of the printer 110 (e.g., 110b, . . . , 110x) as the transmission originator of the operation-confirmation-message to "No Confirmation Needed" (shown as a mark "X" in FIG. 3). This results in that the operation confirmer 115 does not transmit the operation-confirmation-message to the printer 110 (e.g., 110b, . . . , 110x) as the transmission originator of the operation-confirmation-message only once. Since the printer 110 (e.g., 110b, . . . , 110x) as the transmission originator having transmitted the operation-confirmation-message can be regarded as being normally operating, transmission of the operation-confirmation-message can be omitted. When apparatus-information such as the consumables-status-information or printer-status-information on the printer 110 (e.g., 110b, . . . , 110x) is included in the operation-confirmation-message, the operation-confirmation responder 116 of the printer 110 (e.g., 110a) updates the printer-information 114a on the basis of the apparatus-information.

Next, the operation-confirmation responder 116 of the printer 110 (e.g., 110a) generates an operation-confirmation-response-message including the identification-information of the printer 110 (e.g., 110a) as the own-apparatus (step S91). In this connection, the operation-confirmation-response-message may include consumables-status-information such as maximum-paper-size of the printer 110 (e.g., 110a) as the own-apparatus. The operation-confirmation-response-message may also include printer-status-information as the status-information of the printer 110 (e.g., 110a) as the own-apparatus, for example, the trouble-information such as paper jamming.

Next, the operation-confirmation responder 116 transmits the operation-confirmation-response-message generated at step S91 through the communication controller 123 to the printer 110 (e.g., 110b, . . . , 110x) as the transmission originator of the operation-confirmation-message (step S92).

As has been described above, when receiving the operation-confirmation-message, the printer 110 (e.g., 110a) according to the first embodiment transmits the operation-confirmation-response-message. Further, the printer 110 (e.g., 110a) according to the first embodiment regards any of the printers 110 (e.g., 110b, . . . , 110x) which is the transmission originator of the operation-confirmation-message as being normally operating, and omits transmission of the operation-confirmation-message of the operation confirmer 115 at least once.

In this connection, the number of omission in the transmission of the operation-confirmation-message is not limited to one time but a plurality of omissions can be allowed. In this case, the operation confirmer 115 previously counts the transmission omission frequency after the operation-confirmation-information is set at "No Confirmation Needed" (shown as a mark "X" in FIG. 3), and after a specific frequency of transmission omission, updates the operation-confirmation-information from "No Confirmation Needed" (shown as a mark "X" in FIG. 3) to "Confirmation Needed" (shown as a mark "O" in FIG. 3) at step S88 of FIG. 12.

Figure 14:
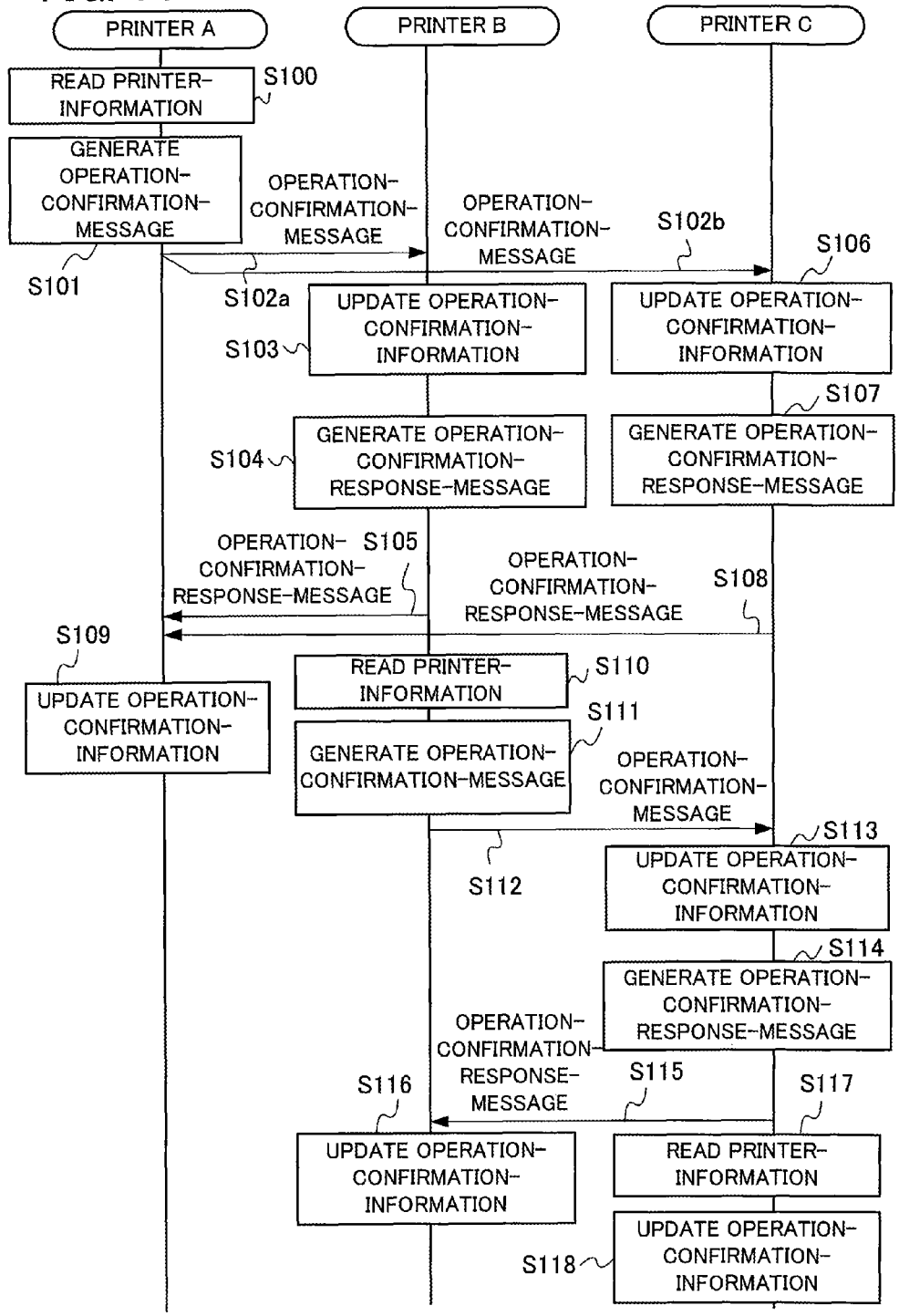
FIG. 14 is a sequence diagram showing operation-confirmation processing which is performed by three printers connected to the network in the first embodiment.

FIG. 14 is a sequence diagram showing operation-confirmation processing of three printers among the printers 110 (e.g., 110a, 110b, . . . , 110x) connected to the network 150 in the first embodiment. In the sequence diagram shown in FIG. 14, three printers A, B and C are connected to the network 150. The printers A, B and C have been already activated and they belong to the same printer-group. The operation-confirmation-information of the printer-information 114a already stored in the respective printer-information memories 114 of the printers A, B and C are set all at "Confirmation Needed" (shown as a mark "O" in FIG. 3). In addition, the operation-confirmation processing of the printers A, B and C are executed in this order.

The operation confirmer 115 of the printer A specifies one of the other printers 110 (e.g., 110b, . . . , 110x) belonging to the same printer-group as the own-apparatus and having the operation-confirmation-information set at "Confirmation Needed" (shown as a mark "O" in FIG. 3) on the basis of the printer-information 114a, after elapse of a predetermined time from the completion of the searching processing of the searcher 112 or from the completion of the previous operation-confirmation processing (step S100). The printer-information 114a of the printer A already includes IP-addresses as identification-information of the printers B and C, and the operation-confirmation-information are set all at "Confirmation Needed" (shown as a mark "O" in FIG. 3). At this time, the operation confirmer 115 previously acquires the IP-address of the other specified printer 110.

The operation confirmer 115 of the printer A next generates an operation-confirmation-message (step S101). The operation confirmer 115 of the printer A transmits the operation-confirmation-message generated through the communication controller 123 to the printers B and C (steps S102a and S102b).

The operation-confirmation responder 116 of the printer B when receiving the operation-confirmation-message from the printer A modifies the operation-confirmation-information corresponding to the printer A to "No Confirmation Needed" (shown as a mark "X" in FIG. 3) (step S103). When the apparatus-information of the printer A is included in the received operation-confirmation-message, the operation-confirmation responder 116 updates the apparatus-information of the printer A having the printer-information 114a recorded therein on the basis of the apparatus-information.

After that, the operation-confirmation responder 116 of the printer B generates an operation-confirmation-response-message (step S104). The operation-confirmation responder 116 transmits the generated operation-confirmation-response-message through the communication controller 123 to the printer A (step S105).

The operation-confirmation responder 116 of the printer C when receiving the operation-confirmation-message from the printer A modifies the operation-confirmation-information corresponding to the printer A to "No Confirmation Needed" (shown as a mark "X" in FIG. 3) in the printer-information 114a (step S106). When the apparatus-information of the printer A is included in the received operation-confirmation-message, the operation-confirmation responder 116 updates the apparatus-information of the printer A having the printer-information 114a recorded therein on the basis of the apparatus-information.

The operation-confirmation responder 116 of the printer C generates an operation-confirmation-response-message (step S107). The operation-confirmation responder 116 transmits the generated operation-confirmation-response-message through the communication controller 123 to the printer A (step S108).

The operation confirmer 115 determines that the printers B and C belonging to the same printer-group as the own-apparatus are normally operating, when receiving the operation-confirmation-response-message from the printers B and C through the communication controller 123. The operation confirmer 115 rewrites the operation-confirmation-information recorded in the printer-information 114a all to "Confirmation Needed" (shown as a mark "O" in FIG. 3) (step S109). When apparatus-information of at least one of the printers B and C is included in the operation-confirmation-response-message, the operation confirmer 115 updates the corresponding apparatus-information recorded in the printer-information 114a on the basis of the apparatus-information.

After elapse of a predetermined time from the completion of the searching processing of the searcher 112 or from the completion of the previous-time operation-confirmation processing, the operation confirmer 115 of the printer B refers to the printer-information 114a and specifies one of the other printers belonging to the same printer-group as the own-apparatus and having the operation-confirmation-information set at "Confirmation Needed" (shown as a mark "O" in FIG. 3) (step S110). In this case, the apparatus-information of the printers A and C are recorded in the printer-information 114a of the printer B. In the printer-information 114a of the printer B, the operation-confirmation-information of the printer A is set at "No Confirmation Needed" (shown as a mark "X" in FIG. 3) at step S103, and the operation-confirmation-information of the printer C is set at "Confirmation Needed" (shown as a mark "O" in FIG. 3). At this time, the operation confirmer 115 previously acquires the IP-address of the specified other printers.

The operation confirmer 115 of the printer B generates an operation-confirmation-message (step S111). The operation confirmer 115 of the printer B transmits the generated operation-confirmation-message through the communication controller 123 to the printer C (step S112).

In the printer C when receiving the operation-confirmation-message from the printer B, the operation-confirmation responder 116 modifies the operation-confirmation-information corresponding to the printer B in the printer-information 114a to "No Confirmation Needed" (shown as a mark "X" in FIG. 3) (step S113). When the apparatus-information of the printer B is included in the received operation-confirmation-message, the operation-confirmation responder 116 updates the apparatus-information of the printer B recorded in the printer-information 114a.

The operation-confirmation responder 116 of the printer C generates an operation-confirmation-response-message (step S114). The operation-confirmation responder 116 transmits the generated operation-confirmation-response-message through the communication controller 123 to the printer B (step S115).

When receiving the operation-confirmation-response-message from the printer B through the communication controller 123, the operation confirmer 115 of the printer B determines that the printer C belong to the same printer-group as the own-apparatus is normally operating. The operation confirmer 115 rewrites all the operation-confirmation-information recorded in the printer-information 114a to "Confirmation Needed" (shown as a mark "O" in FIG. 3) (step S116). When the apparatus-information of the printer C is included in the operation-confirmation-response-message, the operation confirmer 115 updates the apparatus-information of the printer C recorded in the printer-information 114a on the basis of the apparatus-information.

When elapse of a predetermined time from the completion of the searching processing of the searcher 112 or from the completion of the previous-time operation-confirmation processing, the operation confirmer 115 of the printer C refers to the printer-information 114a and specifies one of the other printers belonging to the same printer-group as the own-apparatus and having the operation-confirmation-information set at "Confirmation Needed" (shown as a mark "O" in FIG. 3) (step S117). At this time, the apparatus-information of the printers A and B are recorded in the printer-information 114a of the printer C. In the printer-information 114a of the printer C, the operation-confirmation-information of the printers A and B are set at "No Confirmation Needed" (shown as a mark "X" in FIG. 3) at steps S106 and S113. For this reason, at step S117, since there is no other printers which has the operation-confirmation-information set at "Confirmation Needed" (shown as a mark "O" in FIG. 3), the operation confirmer 115 of the printer C does not generate the operation-confirmation-message nor transmit the message.

The operation confirmer 115 of the printer C rewrites all the operation-confirmation-information recorded in the printer-information 114a to "Confirmation Needed" (shown as a mark "O" in FIG. 3) (step S118).

As has been described above, when operation-confirmation is carried out for a plurality of printers A, B and C connected to the network 150, the printer is determined that the printer is normally operation on the basis of whether not the printer 110 has received the operation-confirmation-message. Thus, the transmission and reception of the operation-confirmation-message and the operation-confirmation-response-message can be omitted. In the sequence diagram of FIG. 14, for example, the transmission and reception of the operation-confirmation-message from the printer B to the printer A, the operation-confirmation-message from the printer C to the printers A and B, and the operation-confirmation-response-message as a response to these operation-confirmation-messages, can be omitted.

Figure 15:
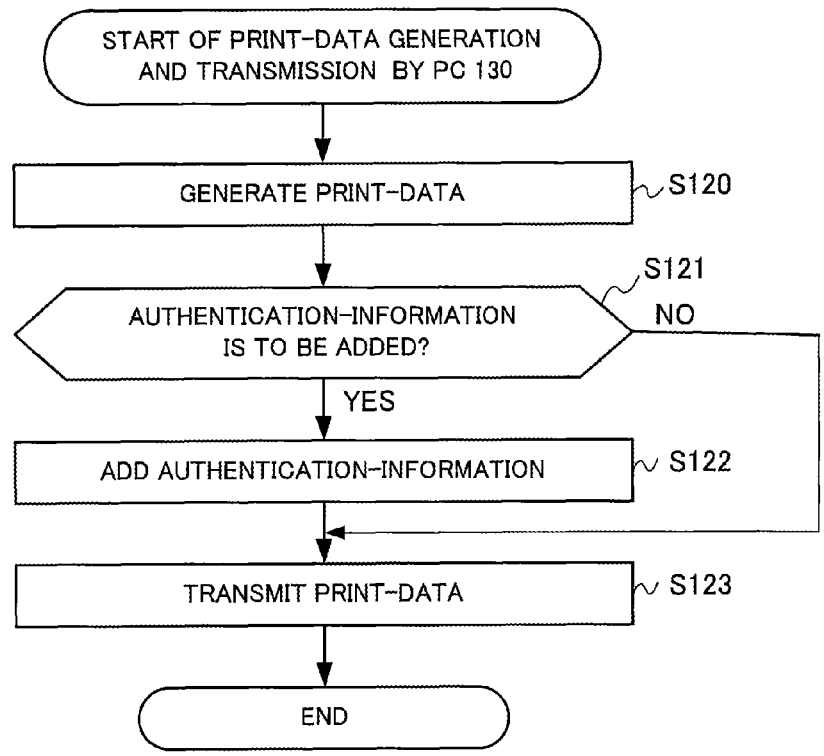
FIG. 15 is a flowchart showing processing of the PC when the PC generates and transmits print-data in the first embodiment.

FIG. 15 is a flowchart showing processing in which the PC 130 in the first embodiment generates print-data and transmits it. Processing of FIG. 15 is started, for example, when the user issues a document print instruction through the UIF 132.

The print-data generator 131 generates print-data from a document as a print instruction target (step S120).

Next, the print-data generator 131 determines whether or not to add the authentication-information to the print-data (step S121). For example, when the user of the PC 130 selects immediate printing through the UIF 132, the print-data generator 131 determines no addition of the authentication-information. When the user does not select immediate printing, the print-data generator 131 determines addition of the authentication-information. When the print-data generator 131 determines the addition of the authentication-information (YES at step S121), processing of the print-data generator proceeds to step S122. When the print-data generator 131 determines no addition of the authentication-information (NO at step S121), processing of the print-data generator 131 proceeds to step S123.

At step S122, the print-data generator 131 adds the authentication-information to the print-data generated at step S120. For example, the print-data generator 131 sets the value of the extended variable "Confidential" on line 10 at "YES" in the print-data 170 in FIG. 5, and adds the authentication-information of the user to the value of the extended variable "AuthenticationData" on line 13 in FIG. 5. The print-data generator 131 receives user's input of the authentication-information, e.g., through the UIF 132 as necessary.

At step S123, the print-data generator 131 transmits the print-data to the printer 110 as a transmission-destination. In this case, the printer 110 as a transmission-destination is any of the printers 110 (e.g., 110a, 110b, . . . , 110x) set for the PC 130. For example, the user of the PC 130 or the administrator of the image forming system 100 can set any of the printers 110 (e.g., 110a, 110b, . . . , 110x) as a transmission-destination of the PC 130 through the UIF 132.

As has been described above, the PC 130 in the first embodiment can generate the print-data and transmit it to any of the printers 110 (e.g., 110a, 110b, . . . , 110x).

Figure 16:
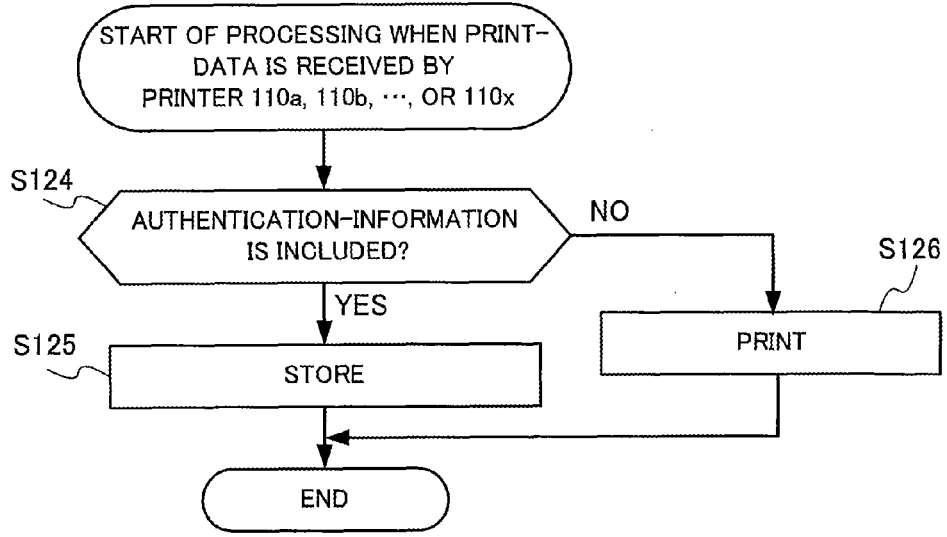
FIG. 16 is a flowchart showing processing of the printer when the printer received the print-data in the first embodiment.

FIG. 16 is a flowchart showing processing in which the printer 110 (e.g., 110a) according to the first embodiment receives the print-data. Processing shown in FIG. 16 is started when the print-data manager 117 of the printer 110 (e.g., 110a) acquires the print-data through the communication controller 123.

The print-data manager 117 confirms whether or not the authentication-information is included in the print-data received from the communication controller 123 (step S124). When the authentication-information is included (YES at step S124), the print-data manager 117 advances the processing to step S125; whereas, when the authentication-information is not included (NO at step S124), the print-data manager 117 advances the processing to step S126.

At step S125, the print-data manager 117 stores the received print-data in the print-data storage 118.

At step S126, the print-data manager 117 transmits the received print-data to the printing unit 122, and on the basis of the received print-data, causes the printing unit 122 to execute its printing.

As has been described above, when the printer 110 (e.g., 110a) according to the first embodiment receives the print-data having the authentication-information, the printer 110 (e.g., 110a) stores the print-data in the print-data storage 118.

Figure 17:
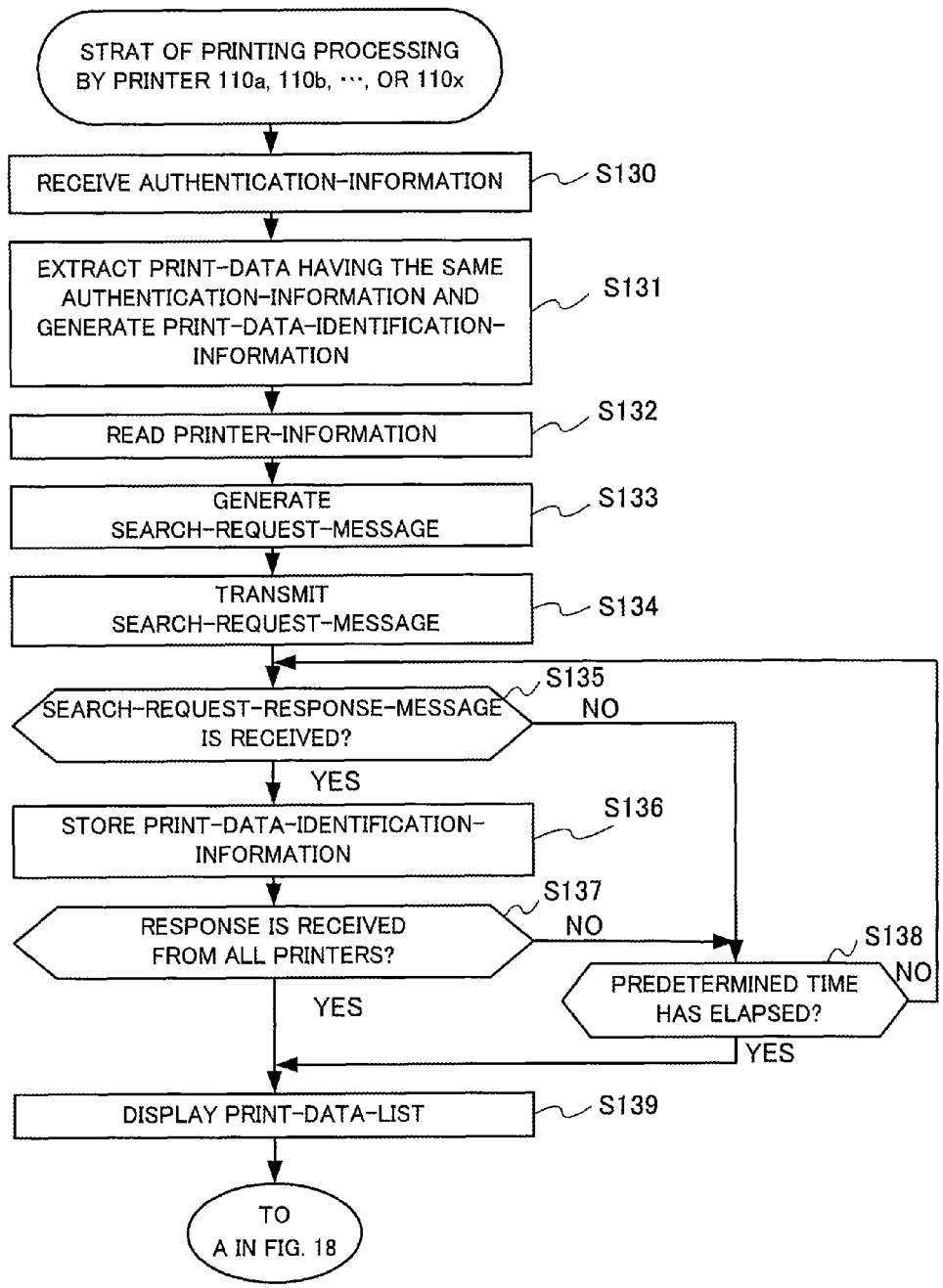
FIG. 17 is a flowchart showing printing processing of the printer when the printer prints the print-data having authentication-information in the first embodiment.
Figure 18:
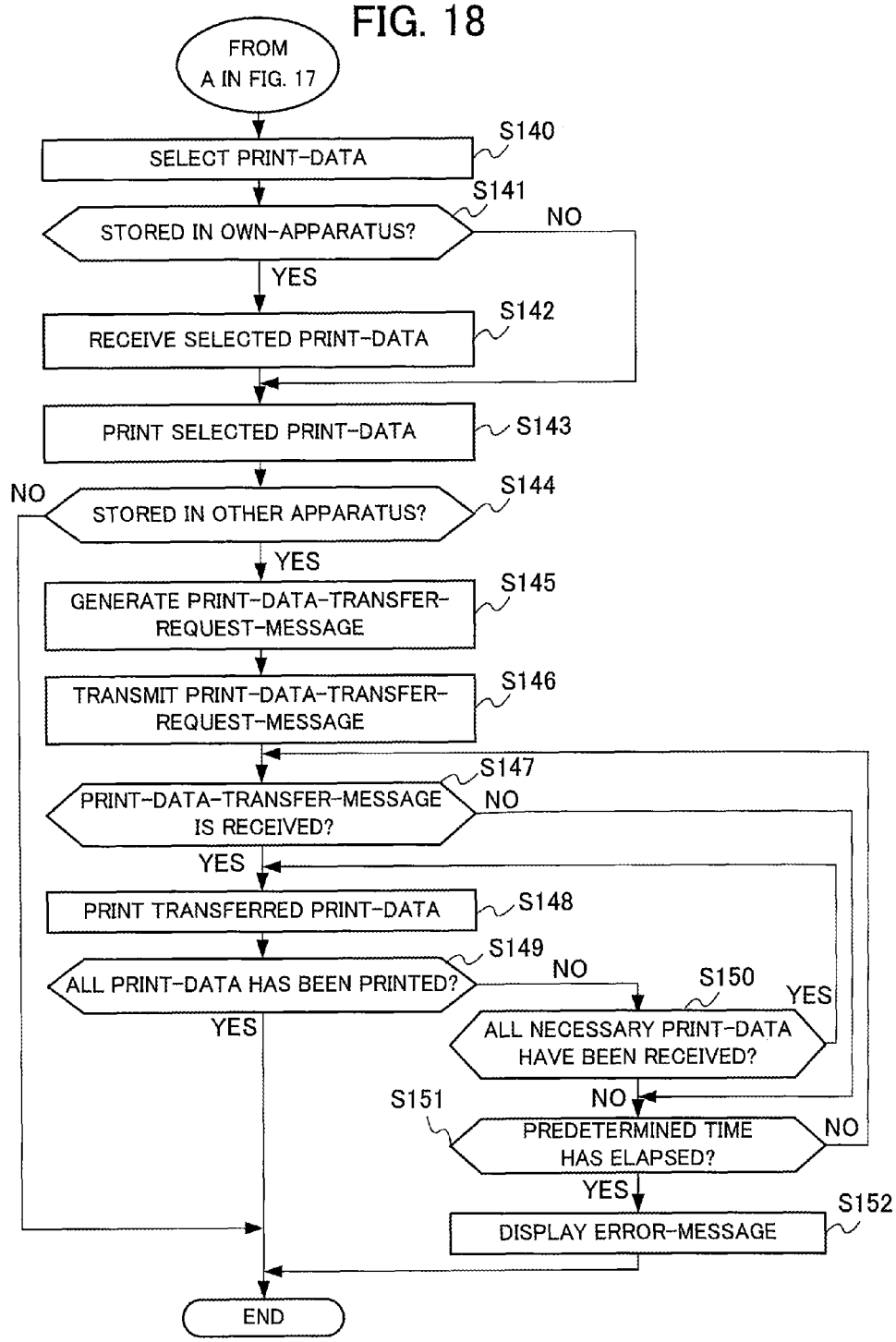
FIG. 18 is a flowchart showing the printing processing continued from FIG. 17.

FIGS. 17 and 18 are flowcharts showing processing in which the printer 110 (e.g., 110a) according to the first embodiment prints the print-data having the authentication-information. The processing of the flowchart shown in FIG. 17 is started when the user conducts authentication using the authenticator 120 of the printer 110 (e.g., 110a).

The print-data manager 117 receives the authentication-information from the authenticator 120 (step S130). The print-data manager 117 specifies print-data having the authentication-information received at step S130 coincided with the authentication-information included in the print-data among the print-data stored in the print-data storage 118. The print-data manager 117 extracts information necessary to specify the corresponding print-data from the specified print-data, and generates print-data-identification-information based on the extracted information (step S131). The print-data-identification-information includes, for example, the identification-information of the printer 110 (e.g., 110a) having the print-data stored therein and the identification-information (e.g., file name) of the print-data. It is desirable that a document name, a generation date and a print pages count included in the control data of the print-data be included in the print-data-identification-information. In this connection, the print-data-identification-information may include the authentication-information of the print-data. The print-data manager 117 stores the generated print-data-identification-information in the temporary memory 119.

Next, the print-data manager 117 refers to the printer-information 114a and specifies the other printers 110 (e.g., 110b, . . . , 110x) belonging to the same printer-group as the own-apparatus (step S132). At this time, the print-data manager 117 previously acquires the IP-address of the specified other printers 110 (e.g., 110b, . . . , 110x).

The print-data manager 117 next generates a search-response-message (step S133). The print-data manager 117 inserts the identification-information of the own-apparatus and the authentication-information received at step S130 in the search-response-message.

The print-data manager 117 then transmits the search-response-message generated at step S133 to the other printers 110 (e.g., 110b, . . . , 110x) specified at step S130 (step S134).

The print-data manager 117 then confirms whether or not to have received the search-request-response-message as a response to the search-response-message transmitted at step S134 through the communication controller 123 (step S135). When receiving the search-request-response-message (YES at step S135), the print-data manager 117 advances the processing to step S136. When failing to receive the search-request-response-message (NO at step S135), the print-data manager 117 advances the processing to step S138.

At step S136, the print-data manager 117 extracts print-data-identification-information from the received search-request-response-message, and stores the print-data-identification-information in the temporary memory 119.

Next, the print-data manager 117 confirms whether or not to have received the search-request-response-message from all the printers 110 (e.g., 110b, . . . , 110x) as the transmission-destinations of the search-response-message at step S134 through the communication controller 123 (step S137). When the print-data manager 117 receives the search-request-response-messages from all the printers 110 (e.g., 110b, ..., 110x) (YES at step S137), the print-data manager 117 advances the processing to step S139. When failing to receive the search-request-response-messages from all the printers 110 (e.g., 110b, ..., 110x) (NO at step S137), namely, when any of search-request-response-messages are not received by the print-data manager 117, the print-data manager 117 advances the processing to step S138.

At step S138, the print-data manager 117 confirms elapse or non-elapse of a predetermined time from the transmission of the search-response-message at step S134 (step S138). An elapse of the predetermined time (YES at step S138) causes the print-data manager 117 to proceeds to step S139. Non-elapse of the predetermined time (NO at step S138) causes the print-data manager 117 to return to the processing of step S135. At step S138, the elapse of the predetermined time (YES at step S138) causes the print-data manager 117 to proceed to the processing of step S152 in FIG. 18, where an error message may be displayed on the UIF 121.

At step S139, the print-data manager 117 generates a print-data-selection-picture to select print-data to be printed on the basis of the print-data-identification-information stored in the temporary memory 119 at steps S131 and S136. The print-data manager 117 causes the generated print-data-selection-picture to be displayed on the UIF 121 to receive user's selection. In this case, the print-data-selection-picture is used for the authenticated user to select print-data to be actually printed from printable print-data stored in the same printer-group as the own-apparatus.

Figure 19:
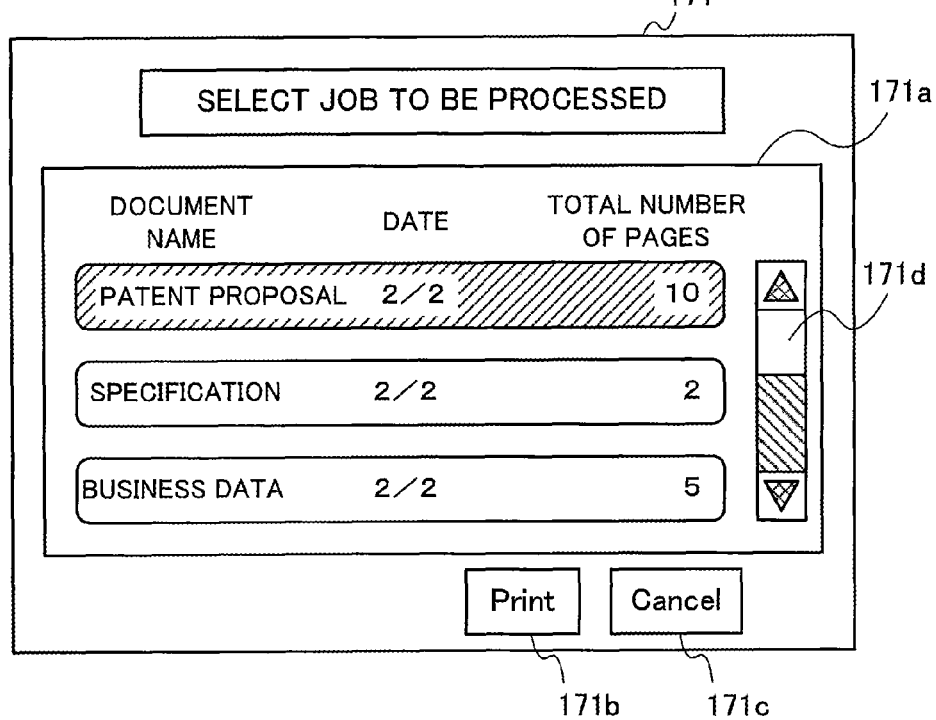
FIG. 19 is a schematic diagram showing an example of a print-data selection picture in the first embodiment.

FIG. 19 schematically shows an example of a print-data-selection-picture 171. The print-data-selection-picture 171 has a print-data selection zone 171a, a print instruction zone 171b, and a cancel instruction zone 171c.

The print-data selection zone 171a is used to receive an input of selection of print-data. For example, the document name, generation date and pages count of the print-data recorded in the print-data-identification-information stored in the temporary memory 119 at steps S131 and S136 are displayed in the print-data selection zone 171a. The user identities the print-data based on the displayed document name, generation data and pages count, and selects one of the print-data to be printed. In this connection, hidden print-data incapable of being displayed in the print-data selection zone 171a can be displayed by moving a scroll bar 171d.

Referring to FIG. 17, the print-data manager 117, after the processing of step S139, advances the processing to step S140 of FIG. 18.

At step S140 of FIG. 18, the print-data manager 117 receives a user input of a processing instruction through the print-data-selection-picture 171. For example, when one or more of the print-data as a print target or targets are selected in the print-data selection zone 171a and the print-data manager 117 receives an instruction input of the execution instruction selected in the print instruction zone 171b, the print-data manager 117 advances the processing to step S141. When the print-data manager 117 receives an input of an execution instruction selected in the scroll bar 171d, the print-data-selection-picture 171 terminates processing shown in FIGS. 17 and 18 regardless of presence or absence of selection in the print-data selection zone 171a. In this connection, when no input is present for a predetermined time, the print-data manager 117 may determine the presence of an input of cancel instruction and may terminate processing of FIGS. 17 and 18.

At step S141, the print-data manager 117 determines whether or not the print-data selected at step S140 is stored in the print-data storage 118 of the own-apparatus. When the print-data manager 117 determines that the selected print-data is already stored in the own-apparatus (YES at step S141), the print-data manager 117 advances the processing to step S142. When the print-data manager 117 determines that the selected print-data is not stored in the own-apparatus (NO at step S141), the print-data manager 117 advances the processing to step S144.

At step S142, the print-data manager 117 acquires the print-data selected at step S140 from the print-data storage 118 of the own-apparatus. At this time, the print-data manager 117 deletes the print-data acquired from the print-data storage 118 so that the print-data does not remain in the print-data storage 118.

The print-data manager 117 then provides the print-data acquired at step S142 to the printing unit 122 to cause the printing unit 122 to execute its printing processing (step S143).

Next, the print-data manager 117 of the printer 110 (e.g., 110a) determines whether or not the print-data selected at step S140 is stored in the other printers 110 (e.g., 110b, ..., 110x). When determining that the selected print-data is stored in the other printers 110 (e.g., 110b, ..., 110x) (YES at step S144), the print-data manager 117 advances the processing to step S145. When the print-data manager 117 determines that the selected print-data is not stored in the other printers 110 (e.g., 110b, ..., 110x) (NO at step S144), the print-data manager 117 terminates processing of FIGS. 17 and 18.

At step S145, the print-data manager 117 of the printer 110 (e.g., 110a) generates a print-data-transfer-request-message to require the transmission of the print-data selected at step S140 and determined as stored in the other printers 110 (e.g., 110b, ..., 110x). The print-data-transfer-request-message includes print-data-identification-information of the print-data selected at step S140 and determined as stored in the other printers 110 (e.g., 110b, ..., 110x).

The print-data manager 117 then transmits the generated print-data-transfer-request-message through the communication controller 123 to the printer 110 storing the print-data selected at step S140 (step S146).

The print-data manager 117 next confirms whether or not to have received a print-data-transfer-message as a response to the print-data-transfer-request-message transmitted at step S146 through the communication controller 123 (step S147). When receiving the print-data-transfer-message (YES at step S147), the print-data manager 117 advances the processing to step S148. When failing to receive the print-data-transfer-message (NO at step S147), the print-data manager 117 advances the processing to step S151.

At step S148, the print-data manager 117 extracts the print-data from the print-data-transfer-message. Furthermore, the print-data manager 117 passes the extracted print-data to the printing unit 122 to execute its printing.

The print-data manager 117 then confirms on the basis of all the print-data selected at step S140 whether or not the printing unit 122 printed the print-data (step S149). When all the print-data are printed (YES at step S149), the print-data manager 117 terminates processing of FIGS. 17 and 18. When all the print-data are not printed (NO at step S149), namely, when there exists any of the print-data selected at step S140 which is not printed yet, the print-data manager 117 advances the processing to step S150.

At step S150, the print-data manager 117 confirms whether or not to have completed receiving of the print-data selected at step S140 which are stored in the other printers 110 (e.g., 110b, . . . , 110x). When the print-data manager 117 receives all such print-data (YES at step S150), the print-data manager 117 returns to the processing of step S148. When the print-data manager 117 fails to receive all such print-data (NO at step S150), namely, when there exists any of the print-data selected at step S140 and stored in the other printers 110 (e.g., 110b, . . . , 110x), which is not received, the print-data manager 117 advances the processing to step S151.

At step S151, the print-data manager 117 confirms elapse or non-elapse of a predetermined time from the transmission of the print-data-transfer-request-message at step S146. Elapse of the predetermined time (YES at step S151) causes the print-data manager 117 to proceed to step S152; whereas, non-elapse of the predetermined time (NO at step S151) causes the print-data manager 117 to return to the processing of step S147.

At step S152, the print-data manager 117 generates an error picture to display an error message indicative of failure of completion of the printing processing. The print-data manager 117 displays the generated error picture on the UIF 121. At this time, the print-data manager 117 may insert such a message as to specify the print-data of no completion of the printing.

As has been described above, after the user is authenticated, the printer 110 (e.g., 110a) as the own-apparatus of the authenticated user in the first embodiment can print any of the print-data stored in any of the printers 110 (e.g., 110b, . . . , 110x) belonging to the same printer-group as the own-apparatus which has user's authentication-information.

Although user's input of the print-data to be printed is received at step S140 in the flowchart shown in FIGS. 17 and 18, such input processing may be omitted. When such input operation is omitted, the printing unit 122 may perform its printing operation, for example, on the basis of all ones of the print-data stored in the printers 110 (e.g., 110b, . . . , 110x) belonging to the same printer-group as the own-apparatus which have the authentication-information coinciding with the user's authentication-information. When the processing of steps S132 to S138 shown in FIG. 17 and the processing of step S144 to S152 shown in FIG. 18 are omitted, the printer 110 (e.g., 110a) may be arranged to print only one of the print-data stored in the own-apparatus which have the authentication-information coinciding with user's authentication-information.

In the flowchart shown in FIGS. 17 and 18, all the print-data selected at step 140 are printed at steps S143 and S148. Instead, when the printer 110 authenticated by the user cannot meet the capability of the printer required by the selected print-data, for example, when the printer 110 can print paper up to A4 size and the print-data requires A3 size paper, the print-data manager 117 may generate an alarm image and may display the alarm image on the UIF 121. It is desirable that the alarm picture include such a message as to specify the print-data not compatible with the printing capability of the printer 110. It is also desirable that such an area as to cause the user to select continuation or stop of the printing operation be provided in the alarm image. When the user selects the continuation of the printing operation, the print-data manager 117 continues the printing operation; whereas, when the user selects the stop of the printing operation, the print-data manager 117 stops the printing operation.

In the flowchart shown in FIGS. 17 and 18, all of print-data stored in the other printers 110 (e.g., 110b, . . . , 110x) belonging to the same printer-group as the printer 110 (e.g., 110a) as the own-apparatus and including the authentication-information coinciding with the user's authentication-information are displayed on the print-data-selection-picture 171 at step S139. Instead, when the printer 110 (e.g., 110a) authenticated by the user cannot meet the capability of the printer required by the selected print-data, for example, when the printer 110 (e.g., 110a) can print paper sheets of sizes up to A4 and the print-data requires an A3 size; the print-data manager 117 may be arranged so as not to display information about the print-data not compatible with the printing capability of the printer 110 (e.g., 110a) on the print-data-selection-picture 171. The print-data manager 117 may be arranged so that such a print-data-selection-picture 171 cannot be displayed and the printing unit 122 can print only the print-data compatible with the printing capability of the own-apparatus.

Figure 20:
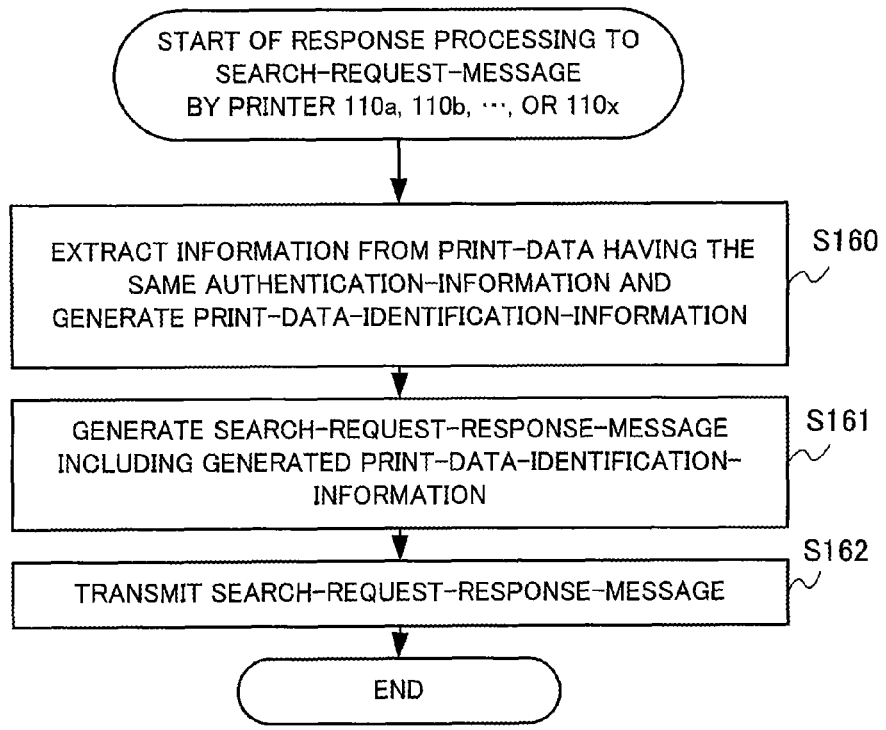
FIG. 20 is a flowchart showing response processing of the printer when the printer received a search-request-message in the first embodiment.

FIG. 20 is a flowchart showing processing in which the printer 110 (e.g., 110a) according to the first embodiment receives a search-response-message. The processing of the flowchart shown in FIG. 20 is started when the print-data manager 117 of the printer 110 (e.g., 110a) receives the search-response-message through the communication controller 123.

The print-data manager 117 acquires authentication-information included in the received search-response-message. The print-data manager 117 then specifies any of the print-data stored in the print-data storage 118 which have authentication-information coinciding with the acquired authentication-information. The print-data manager 117 generates print-data-identification-information by extracting necessary information from the specified print-data (step S160).

Next, the print-data manager 117 generates a search-request-response-message including the print-data-identification-information generated at step S160 (step S161).

The print-data manager 117 then transmits the search-request-response-message generated at step S161 to the printer 110 (e.g., 110b, . . . , 110x) as the transmission originator of the search-response-message through the communication controller 123 (step S162).

As has been described above, the printer 110 (e.g., 110a) according to the first embodiment can transmit the print-data-identification-information relating to the print-data stored in the printer 110 (e.g., 110a) to the other printers 110 (e.g., 110b, . . . , 110x). The print-data manager 117 of the printer 110 (e.g., 110a) determines whether or not the identification-information of the printer 110 (e.g., 110b, . . . , 110x) as the transmission originator of the search-response-message is recorded in the printer-information 114a before processing of step S160. When the identification-information is not recorded in the printer-information 114a, the print-data manager 117 may terminate processing.

FIG. 21 is a flowchart showing processing in which the printer 110 (e.g., 110a) according to the first embodiment receives the print-data-transfer-request-message. Processing shown in FIG. 21 is started when the print-data manager 117 of the printer 110 (e.g., 110a) receives the print-data-transfer-request-message through the communication controller 123.

The print-data manager 117 acquires the print-data specified by the print-data-identification-information from the print-data storage 118 on the basis of the print-data-identification-information included in the received print-data-transfer-request-message. The print-data manager 117 also deletes the print-data from the print-data storage 118 (step S170).

Next, the print-data manager 117 generates a print-data-transfer-message including the print-data acquired at step S170 (step S171).

The print-data manager 117 then transmits the print-data-transfer-message generated at step S171 through the communication controller 123 to the printer 110 (e.g., 110b, . . . , 110x) as the transmission originator of the print-data-transfer-request-message (step S172).

As has been described above, the printer 110 (e.g., 110a) according to the first embodiment can transmit the print-data stored in the printer 110 (e.g., 110a) to the other printers 110 (e.g., 110b, . . . , 110x). In this connection, the print-data manager 117 may determine whether or not the identification-information of the printer 110 (e.g., 110b, . . . , 110x) as the transmission originator of the print-data-transfer-request-message is recorded in the printer-information 114a before processing of step S170, and the identification-information is not recorded in the printer-information 114a, the print-data manager 117 may terminate processing.

As has been described above, in the first embodiment, the searcher 112 and search responder 113 of the printer 110 (e.g., 110a) enable a plurality of printers 110 (e.g., 110b, . . . , 110x) connected to the network 150 to be mutually searched, which printers forming a printer-group. Since a passphrase is used for each printer-group upon searching, a plurality of printer-groups can be formed in the same network 150. Further, use of the passphrase upon searching enables the formation of a printer-group to be limited to specific printers among the printers 110 (e.g., 110a, 110b, . . . , 110x).

As has been described above in detail, in the first embodiment, when a plurality of the printers connected to the network 150 is formed as a printer-group, the use of the passphrase enables the range of the printer-group to be limited to specific printers among the printers 110 (e.g., 110a, 110b, . . . , 110x). For this reason, when printers located in a physically near range forms a printer-group, for example, the user can print with use of any one of the printers 110 (e.g., 110a, 110b, . . . , 110x) in the physically near range to user's PC 130. Thus, in the first embodiment, a security can be increased without deteriorating such convenience that any printer can be used for the user.

Second Embodiment

Explanation will next be made as to the second embodiment. As shown in FIG. 1, an image forming system 200 according to the second embodiment includes printers 110 (e.g., 110a, 110b, . . . , 110x) as image forming apparatuses and a PC 230 as an information processing device. The image forming system 200 according to the second embodiment is different from the image forming system 100 according to the first embodiment in respect of the PC.

FIG. 22 is a block diagram schematically showing an arrangement of the PC 230 in the image forming system 200 according to the second embodiment. The PC 230 has a print-data generator 231, a UIF 132, a communication controller 133, a searcher 234 and a storage 235. The PC 230 in the second embodiment is different from the PC 130 in the first embodiment, in respects of processing of the print-data generator 231 and additional provision of the searcher 234 and the storage 235. The searcher 234 of the PC 230 is also referred to as "a second searcher" and the storage 235 is also referred to as "a second memory".

The searcher 234 of the PC 230 searches the printers 110 (e.g., 110a, 110b, . . . , 110x) connected to the network 150. For example, the searcher 234 transmits a predetermined search-message through the communication controller 133 to the printers 110 (e.g., 110a, 110b, . . . , 110x) connected to the network 150. It is desirable that the searcher 234 transmit the search-message by broadcasting. The search-message includes identification-information of the PC 230 and information indicating that the search-message is generated by the PC 230. In the second embodiment, for example, the information indicating that the search-message is generated by the PC 230 is a PC name including the identification-information unique to the PC 230. When a passphrase is set for the PC 230, the search-message includes the passphrase of the PC 230 as an own-apparatus.

The searcher 234 receives search-response-messages from the printers 110 (e.g., 110a, 110b, . . . , 110x) connected to the network 150 through the communication controller 133. The search-response-messages from the printers 110 (e.g., 110a, 110b, . . . , 110x) are responses to the search-message. Each of the search-response-messages includes apparatus-information of each of the printers 110 (e.g., 110a, 110b, . . . , 110x) as the transmission originator of the search-response-message. The searcher 234 generates a transmission-destination-information indicative of the identification-information of the printer as the transmission-destination of the print-data on the basis of the apparatus-information included in the search-response-message, and then the transmission-destination-information is stored in the storage 235 of the PC 230.

The storage 235 stores the transmission-destination-information given from the searcher 234. When a passphrase is set for the PC 230, the storage 235 stores the set passphrase. For example, a user of the PC 230 or an administrator of the image forming system 200 inputs the passphrase through the UIF 132. A plurality of passphrases may be stored in the storage 235.

The print-data generator 231 performs processing similar to the print-data generator 131 in the first embodiment. The print-data generator 231 in the second embodiment is different from the print-data generator 131 in the first embodiment in a point that the print-data generator 231 transmits the generated print-data through the communication controller 133 to the printer 110 (e.g., 110a, 110b, . . . , 110x) corresponding to the transmission-destination-information stored in the storage 235. When a plurality of printers 110 (e.g., 110a, 110b, . . . , 110x) corresponding to the transmission-destination-information are present, the print-data generator 231 may transmit the print-data to all the printers 110 (e.g., 110a, 110b, . . . , 110x). Further, the print-data generator 231 may receive user's selection of one or ones of the printers 110 (e.g., 110a, 110b, . . . , 110x) from the plurality of printers 110 (e.g., 110a, 110b, . . . , 110x) indicated by the transmission-destination-information through the UIF 132. Furthermore, the print-data generator 231 may also select any one or ones of the plurality of printers 110 (e.g., 110a, 110b, . . . , 110x) indicated by the transmission-destination-information to which the print-data is to be transmitted in accordance with a predetermined rule. The predetermined rule is, for example, a rule in which any one or ones of the plurality of printers 110 (e.g., 110a, 110b, . . . , 110x) are selected in an earlier order of the registration of the printers 110 (e.g., 110a, 110b, . . . , 110x) registered in the transmission-destination-information.

FIG. 23 is a flowchart showing a print-data generation and transmission operation in which the PC 230 in the second embodiment generates and transmits print-data. The operation of FIG. 23 is started, for example, when the user issues an instruction of document printing through the UIF 132.

At step S180, the print-data generator 231 generates the print-data from a document.

At step S181, the print-data generator 231 determines whether or not the authentication-information is to be added to the print-data. For example, when the user of the PC 230 selects immediate printing through the UIF 132, the print-data generator 231 determines that no authentication-information is to be added to the print-data. When the user selects printing other than the immediate printing, the print-data generator 231 determines that the authentication-information is to be added to the print-data. When the print-data generator 231 determined the authentication-information is to be added to the print-data (YES at step S181), processing of the print-data generator 231 proceeds to step S182. When the print-data generator 231 determined the authentication-information is not to be added to the print-data (NO at step S181), processing of the print-data generator 231 proceeds to step S183.

At step S182, the print-data generator 231 adds the authentication-information to the print-data generated at step S180.

At step S183, the searcher 234 generates a search-message to search for the printer 110. The search-message includes the identification-information of the search originator and information indicating that the search-message was transmitted from the PC 230. In the second embodiment, for example, since the identification-information indicative of being PC230 is included in the PC name, the inclusion of the PC name in the search-message indicates that the search-message was transmitted from the PC 230. Further, when a passphrase is set for the PC 230, the search-message includes a passphrase.

At step S184, the searcher 234 then transmits the search-message generated at step S183 through the communication controller 133 to the printers 110 (e.g., 110a, 110b, ..., 110x) connected to the network 150. For example, the searcher 234 transmits the search-message to the printers 110 (e.g., 110a, 110b, ..., 110x) belonging to the same segment by broadcasting. The searcher 234 may transmit the search-message to any one or ones of the printers 110 (e.g., 110a, 110b, ..., 110x), for example, on the basis of setting of the address of the transmission-destination by the user of the printer 110 or the administrator of the image forming system 200. Furthermore, the searcher 234 may transmit the search-message to the printers 110 located within a constant range of the network 150, for example, on the basis of setting of the address of the transmission-destination by the user of the printer 110 or the administrator of the image forming system 200.

At step S185, the searcher 234 confirms whether or not a search-response-message as a response to the search-message transmitted at step S184 has been received through the communication controller 133. When the search-response-message is received (YES at step S185), processing of the searcher 234 proceeds to step S186. When the search-response-message is not received (NO at step S185), processing of the searcher 234 proceeds to step S187.

At step S186, the searcher 234 extracts the identification-information of the printer 110 from the received search-response-message and generates transmission-destination-information indicative of the extracted identification-information. The generated transmission-destination-information is stored in the storage 235. The print-data generator 231 transmits the print-data through the communication controller 133 to the printer 110 indicated by the transmission-destination-information.

At step S187, the searcher 234 confirms whether or not a predetermined time (e.g., 30 seconds) has elapsed from the transmission of the search-message at step S184. When the predetermined time has elapsed (YES at step S187), processing of the searcher 234 proceeds to step S188. When the predetermined time has not elapsed (NO at step S192), processing of the searcher 234 proceeds to step S185.

At step S188, the print-data generator 231 generates a transmission error picture indicating that the printer 110 as the transmission-destination of the print-data is not found in the network 150. The print-data generator 231 provides the generated transmission error picture to the UIF 132 so that the transmission error picture is displayed on the UIF 132.

When receiving the search-message transmitted at step S184 of FIG. 23, the printer 110 performs the processing as shown in the flowchart of FIG. 7.

As has been described above, the PC 230 in the second embodiment searches the printers 110 (e.g., 110a, 110b, ..., 110x) which are connected to the network 150 at the time of transmission of the print-data to find one of them and transmits the print-data to the found printer. This enables the user to transmit the print-data to any one of the printers 110 (e.g., 110a, 110b, ..., 110x) which is normally operating.

In the second embodiment, the print-data generator 231 and the searcher 234 may be arranged so as to select the printer 110 as the transmission-destination of the generated print-data on the basis of at least any one of the consumables-status-information of the printer 110 included in the search-response-message and the printer-status-information. For example, when a plurality of printers 110 (e.g., 110a, 110b, ..., 110x) is found as a result of searching, the print-data generator 231 and the searcher 234 may be also configured so as not to transmit the print-data to ones of the printers 110 (e.g., 110a, 110b, ..., 110x) which have less consumables or have less remaining capacity of a memory area.

Modified Examples

As has been described above in detail, in the second embodiment, when the PC 230 transmits the print-data, the PC 230 searches for operating ones of the printers 110 (e.g., 110a, 110b, ..., 110x) in the network 150. As a result, it can be prevented that the PC 230 tries to transmit the print-data to ones of the printers 110 (e.g., 110a, 110b, ..., 110x) which are not operating. Accordingly, the second embodiment has an additional effect that user's convenience can be enhanced.

In the above-described first and second embodiments, the printer 110 is described as an example of the image forming apparatus. However, the image forming apparatus may be a copying machine, a multi-function peripheral (MFP), a facsimile machine, or other apparatuses that have a printing function.

In the above-described first and second embodiments, the identification-information (IP-address) of the printer 110 or PC 230 as the transmission originator is included in the search-message, the search-response-message, the operation-confirmation-message, the operation-confirmation-response-message, the search-response-message, the search-request-response-message, the print-data-transfer-request-message and the print-data-transfer-message. However, when the IP-address of the printer 110 or PC 230 as the transmission originator can be extracted from the header of the IP packet having these messages in the printer 110 or PC 230 when receiving these messages, for example, it becomes unnecessary to insert the identification-information (e.g., IP-address) of the printer as the transmission originator in these messages.

The above-described first and second embodiments may also be arranged so that, when a passphrase is included in the received message, the communication controller 123 provides the received message to the search responder 113 as a search-message, and when a passphrase is not included in the received message, the communication controller 123 provides the received message to the searcher 112 as a search-response-message. In such a case, the search-message can have the same structure as the search-response-message.

Furthermore, in the first and second embodiments, in order to discriminate among the search-message, the search-response-message, the operation-confirmation-message, the operation-confirmation-response-message, the search-response-message, the search-request-response-message, the print-data-transfer-request-message and the print-data-transfer-message, an identifier may be provided in a header of an IP packet of these messages. The communication controller 123 specifies the transmission-destination of the received message on the basis of the identifier.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image forming apparatus comprising:
a communication controller configured to transmit and receive information to and from a network;
a storage;
a searcher;
a search responder;
an image-information manager configured to receive image-information through the communication controller from the network;
an image-forming unit configured to form an image;
a user interface configured to display a picture and to receive an input from a user; and
an authenticator configured to generate authentication-information for authentication on the basis of the input from the user;
wherein the searcher is configured to:
transmit a first search-message notifying first identification-information for identifying the image forming apparatus as a first image forming apparatus and first group-confirmation-information used for confirming a first apparatus-group to which the first image forming apparatus belongs, through the communication controller to second image forming apparatuses connected to the network,
receive a second search-response-message notifying second identification-information for identifying any of the second image forming apparatuses, through the communication controller from the second image forming apparatuses, and
store the second identification-information notified by the received second search-response-message in the storage;
wherein the search responder is configured to:
receive a second search-message notifying third identification-information for identifying any of the second image forming apparatuses and second group-confirmation-information for confirming a second apparatus-group to which any of the second image forming apparatuses belongs, through the communication controller from any of the second image forming apparatuses, and
transmit a first search-response-message for notifying the first identification-information, through the communication controller to a transmission originator of the received second search-message, when the second apparatus-group confirmed by the second group-confirmation-information notified by the received second search-message is the same as the first apparatus-group to which the first image forming apparatus belongs;
wherein when the authentication-information for use of user authentication is included in the image-information, the image-information manager causes the image-information to be stored in the storage, and when the authentication-information is not included in the image-information, the image-information manager causes the image-forming unit to form the image on the basis of the image-information; and
wherein the image-information manager is configured to:
search the storage for image-information including the authentication-information coinciding with the authentication-information generated by the authenticator,
transmit a search-response-message for notifying the authentication-information generated by the authenticator, through the communication controller to the second image forming apparatus identified by the authentication-information stored in the storage,
receive a search-request-response-message for notifying identification-information for specifying the image-information including the authentication-information coinciding with the authentication-information notified by the search-response-message, through the communication controller from the second image forming apparatuses identified by the identification-information stored in the storage;
generate a selection-picture for selecting the image-information to form an image from the image-information searched from the storage and from the image-information specified by the identification-information, and to display the selection-picture on the user interface;
acquire the selected image-information from the second image forming apparatus through the communication controller, when the image-information selected through the user interface is already stored in the second image forming apparatuses identified by the authentication-information stored in the storage; and
cause the image-forming unit to form an image on the basis of the selected image-information.

2. The image forming apparatus according to claim 1, wherein when the first image forming apparatus is activated, the searcher transmits the first search-message for notifying the first identification-information of the first image forming apparatus and the group-confirmation-information for confirming the first apparatus-group to which the first image forming apparatus belongs.

3. The image forming apparatus according to claim 1, wherein the identification-information includes a communication address in the network.

4. The image forming apparatus according to claim 1, wherein the authentication-information includes at least one of a user ID, a combination of the user ID and a password, a serial number of an authentication medium processed by the user, user's biological information, and arbitrary information set arbitrarily by the user.

5. An image forming apparatus comprising:
a communication controller configured to transmit and receive information to and from a network;
a storage;
a searcher;
a search responder;
an operation confirmer; and
an operation confirmer responder, wherein the searcher is configured to:
transmit a first search-message notifying first identification-information for identifying the image forming apparatus as a first image forming apparatus and first group-confirmation-information used for confirming a first apparatus-group to which the first image forming apparatus belongs, through the communication controller to second image forming apparatuses connected to the network, receive a second search-response-message notifying second identification-information for identifying any of the second image forming apparatuses, through the communication controller from the second image forming apparatuses, and store the second identification-information notified by the received second search-response-message in the storage;

wherein the search responder is configured to:

receive a second search-message notifying third identification-information for identifying any of the second image forming apparatuses and second group-confirmation-information for confirming a second apparatus-group to which any of the second image forming apparatuses belongs, through the communication controller from any of the second image forming apparatuses, and transmit a first search-response-message for notifying the first identification-information, through the communication controller to a transmission originator of the received second search-message, when the second apparatus-group confirmed by the second group-confirmation-information notified by the received second search-message is the same as the first apparatus-group to which the first image forming apparatus belongs;

wherein the operation confirmer is configured to transmit an operation-confirmation-message for confirming whether or not the second image forming apparatuses are operating, through the communication controller to the second image forming apparatuses identified by the authentication-information stored in the storage; and wherein the operation-confirmation responder is configured to:

receive the operation-confirmation-message for confirming whether or not the second image forming apparatuses are operating, through the communication controller from the second image forming apparatuses, and transmit an operation-confirmation-response-message as a response to the received operation-confirmation-message to a transmission originator of the received operation-confirmation-message.

6. The image forming apparatus according to claim 5, wherein when failing to receive the operation-confirmation-response-message as a response to the transmitted operation-confirmation-message after transmission of the operation-confirmation-message for confirming whether or not the second image forming apparatuses are operating, through the communication controller from the second image forming apparatuses identified by the identification-information stored in the storage, the operation confirmer deletes the identification-information of the second image forming apparatuses which do not receive the operation-confirmation-response-message.

7. The image forming apparatus according to claim 5, wherein when failing to receive the operation-confirmation-response-message as a response to the operation-confirmation-message transmitted from the second image forming apparatuses identified by the identification-information stored in the storage for a predetermined time after transmitting the operation-confirmation-message for confirming whether or not the second image forming apparatus are operating, the operation confirmer deletes all the identification-information in the storage and causes the searcher to transmit the search-message.

8. The image forming apparatus according to claim 5, wherein the operation confirmer transmits the operation-confirmation-message for confirming whether or not the second image forming apparatuses are operating, and when receiving another operation-confirmation-message from any of the second image forming apparatuses, the operation confirmer omits transmitting of the operation-confirmation-message at least once.

9. The image forming apparatus according to claim 5, wherein the operation confirmer, when receiving an instruction from the user, transmits the operation-confirmation-message for confirming whether or not the second image forming apparatuses are operating.

10. The image forming apparatus according to claim 5, wherein the operation-confirmation-message for confirming whether or not the second image forming apparatuses are operating and the operation-confirmation-response-message as a response to the operation-confirmation-message for confirming whether or not the second image forming apparatuses are operating are used to notify at least one of name-information, apparatus-type-information, capability information, consumables-status-information and apparatus-status-information of the first image forming apparatus.

11. An image forming system comprising a plurality of image forming apparatuses connected to a network, each of the image forming apparatuses including:

a communication controller configured to transmit and receive information to and from a network;

a storage;

a searcher;

a search responder;

an image-information manager configured to receive image-information through the communication controller from the network;

an image-forming unit configured to form an image;

a user interface configured to display a picture and to receive an input from a user; and an authenticator configured to generate authentication-information for authentication on the basis of the input from the user;

wherein the searcher is configured to:

transmit a first search-message notifying first identification-information for identifying the image forming apparatus as a first image forming apparatus and first group-confirmation-information used for confirming a first apparatus-group to which the first image forming apparatus belongs, through the communication controller to second image forming apparatuses connected to the network, receive a second search-response-message notifying second identification-information for identifying any of the second image forming apparatuses, through the communication controller from the second image forming apparatuses, and store the second identification-information notified by the received second search-response-message in the storage;

wherein the search responder is configured to:

receive a second search-message notifying third identification-information for identifying any of the second image forming apparatuses and second group-confirmation-information for confirming a second apparatus-group to which any of the second image forming apparatuses belongs, through the communication controller from any of the second image forming apparatuses, and transmit a first search-response-message for notifying the first identification-information, through the communication controller to a transmission originator of the received second search-message, when the second apparatus-group confirmed by the second group-confirmation-information notified by the received second search-message is the same as the first apparatus-group to which the first image forming apparatus belongs;

wherein when the authentication-information for use of user authentication is included in the image-information, the image-information manager causes the image-information to be stored in the storage, and when the authentication-information is not included in the image-information, the image-information manager causes the image-forming unit to form the image on the basis of the image-information; and wherein the image-information manager is configured to:

search the storage for image-information including the authentication-information coinciding with the authentication-information generated by the authenticator, transmit a search-response-message for notifying the authentication-information generated by the authenticator, through the communication controller to the second image forming apparatus identified by the authentication-information stored in the storage, receive a search-request-response-message for notifying identification-information for specifying the image-information including the authentication-information coinciding with the authentication-information notified by the search-response-message, through the communication controller from the second image forming apparatuses identified by the identification-information stored in the storage;

generate a selection-picture for selecting the image-information to form an image from the image-information searched from the storage and from the image-information specified by the identification-information, and to display the selection-picture on the user interface, acquire the selected image-information from the second image forming apparatus through the communication controller, when the image-information selected through the user interface is already stored in the second image forming apparatuses identified by the authentication-information stored in the storage, and cause the image-forming unit to form an image on the basis of the selected image-information.

12. The image forming system according to claim 11 further comprising an information processor;

the information processor includes:

another communication controller configured to transmit and receive information to and from the network;

another storage;

another searcher configured to:

transmit another search-message notifying another identification-information for identifying the information processor and another group-confirmation-information used for confirming another apparatus-group to which the information processor belongs, through the another communication controller to the first and second image forming apparatuses connected to the network, receive another search-response-message for notifying the identification-information of the first and second image forming apparatus, through the another communication controller from the first and second image forming apparatus, and store the identification-information notified by the received another search-response-message in said another storage; and a print-data generator configured to generate the print-data and transmit the image data through the another communication controller to the first and second image forming apparatuses identified by the identification-information stored in said another storage.

* * * * *